(12) United States Patent  
Fu et al.

(10) Patent No.: US 8,970,067 B2
(45) Date of Patent: Mar. 3, 2015

(54) HYBRID DC/DC CONVERTERS AND METHODS

(75) Inventors: Dianbo Fu, Plano, TX (US); Hengchun Mao, Plano, TX (US); Bing Cai, Richardson, TX (US)

(73) Assignee: Futurewei Technologies, Inc., Plano, TX (US)

( * ) Notice: Subject to any disclaimer, the term of this patent is extended or adjusted under 35 U.S.C. 154(b) by 640 days.

(21) Appl. No.: 13/307,946

(22) Filed: Nov. 30, 2011

(65) Prior Publication Data

US 2013/0135903 A1    May 30, 2013

(51) Int. Cl.
*H02J 1/00*    (2006.01)
*H02M 3/335*    (2006.01)

(52) U.S. Cl.
CPC . *H02J 1/00* (2013.01); *H02M 3/335* (2013.01)
USPC .......................................................... 307/82

(58) Field of Classification Search
CPC .................................. H02J 1/00; H02M 3/335
USPC .......................................................... 307/82
See application file for complete search history.

(56) References Cited

U.S. PATENT DOCUMENTS

| | | |
|---|---|---|
| 5,999,417 A | 12/1999 | Schlecht |
| 6,788,033 B2 | 9/2004 | Vinciarelli |
| 6,844,702 B2 * | 1/2005 | Giannopoulos et al. ...... 320/108 |
| 6,882,548 B1 | 4/2005 | Jacobs et al. |
| 7,355,373 B2 * | 4/2008 | Melai et al. .................... 323/282 |
| 8,238,121 B2 * | 8/2012 | Torrico-Bascope et al. ................ 363/21.06 |
| 2007/0029984 A1 | 2/2007 | Melai et al. |
| 2011/0273911 A1 | 11/2011 | Torrico-Bascopé et al. |

FOREIGN PATENT DOCUMENTS

| | | |
|---|---|---|
| CN | 1799184 A | 7/2006 |
| CN | 200997564 A | 12/2007 |
| JP | 2007295709 A | 11/2007 |

OTHER PUBLICATIONS

International Search Report and Written Opinion of Patent Cooperation Treaty (PCT), International Application No. PCT/CN2012/085659, Applicant Huawei Technologies Co., Ltd., date of mailing Mar. 7, 2013, 11 pages.

* cited by examiner

*Primary Examiner* — Hal Kaplan
(74) *Attorney, Agent, or Firm* — Slater & Matsil, L.L.P.

(57) ABSTRACT

An embodiment hybrid dc/dc converter comprises a first power source and a low power converter coupled to the first power source. The low power converter generates an output connected in series with the first power source. The hybrid dc/dc converter further comprises a selection network coupled to the first power source and the output of the low power converter and a main unregulated power converter coupled to the selection network. By controlling the voltage across the output of the low power converter, the hybrid dc/dc converter can achieve high efficiency through the unregulated power converter.

20 Claims, 23 Drawing Sheets

HYBRID DC/DC CONVERTERS AND METHODS

TECHNICAL FIELD

The present invention relates to isolated dc/dc converters and methods, and more particularly, to isolated dc/dc converters and methods employing a first stage and a second stage connected in cascade, wherein the output of the second stage can be regulated by adjusting an auxiliary power source of the first stage.

BACKGROUND

A telecommunication network power system usually includes an ac/dc stage converting the power from the ac utility line to a 48V dc distribution bus and a dc/dc stage converting the 48V dc distribution bus to a plurality of voltage levels for all types of telecommunication loads. Both stages may comprise isolated dc/dc converters. Isolated dc/dc converters can be implemented by using different power topologies, such as flyback converters, forward converters, half bridge converters, full bridge converters and the like. As known in the art, bridge converters generally are employed when the power of a dc/dc converter is more than 100 watts.

As shown in FIG. 1, a full bridge converter 100 is a conventional full bridge converter having a full wave rectifier coupled to a center-tapped secondary winding. The full bridge converter 100 includes four switches Q1, Q2, Q3 and Q4 at a primary side of a transformer Tx. The four switches Q1, Q2, Q3 and Q4 form a bridge having two legs. Q1 and Q3 in series connection have a junction point, referred to as A. Q2 and Q4 in series connection have a junction point, referred to as B. The primary winding of the transformer Tx is connected to A and B. A dc supply Vin is connected to the two legs to provide power to the full bridge converter 100. According to the operating principle of a hard switching full bridge converter, the switches Q1 and Q4 are turned on simultaneously for an adjustable time during a first half cycle. After a period of dead time, the switches Q2 and Q3 are turned on simultaneously for an equal time during the second half cycle. As a result, Vin and −Vin are applied to the primary side of the transformer Tx in alternate half periods.

In a fixed duty cycle control scheme, the turn-on time of the switches Q1 and Q4 is equal to the turn-on time of the switches Q2 and Q3. When all four switches are turned off, both S1 and S2 are turned on. The load current flows through S1 and S2. This interval is referred to as a freewheeling period. The output voltage of the bridge converter 100 is proportional to the turn-on time of the switches. A controller (not shown) may detect the output voltage Vo and adjust the turn-on time via a negative feedback control loop (not shown). The secondary side of the transformer Tx is center-tapped. Such a center-tapped secondary and two switches S1 and S2 can form a full wave rectifier, which can convert the primary voltage having double polarities (Vin and −Vin) of the transformer Tx to a secondary voltage having a single polarity. Then, the secondary voltage having a single polarity is fed to an output filter including an inductor Lo and an output capacitor Co. The output filter averages the square voltage pulses at the output of the full wave rectifier and generates a dc voltage at Vo, which is then supplied to a load represented by a resistor RL.

A phase shift full bridge converter is capable of reducing switching losses by means of the zero voltage switching control technique. As shown in a dashed rectangle 120 of FIG. 1, instead of turning on two primary switches (e.g., Q1 and Q4) simultaneously, the turn-on time of these two switches are shifted by a period of time. More particularly, as depicted in the dashed rectangle 120, a waveform 1061 and a waveform 1101 show Q1 is on for a period of time before Q4 is turned on. There is an overlap between Q1's turn-on time and Q4's turn-on time. After Q1 is turned off, Q4 stays on for a period of time. Likewise, a waveform 1081 and a waveform 1121 show there is a phase shift between Q2 and Q3's turn-on time. A waveform 1021 shows the on-time of switches S2 and S3. A waveform 1041 shows the on-time of switches S1 and S4.

The phase shift full bridge can achieve a zero voltage switching by utilizing the L-C resonance between transformer leakage inductance and MOSFET (e.g., Q1) output capacitance. For example, Q3 has a parasitic capacitor (not shown) across its drain and source. During the period when both Q1 and Q4 are on, the voltage across Q3's parasitic capacitor is charged to a voltage approximately equal to Vin. According to the basic principle of the phase shift control technique, Q1 is off prior to Q4. After Q1 is off, the primary side current cannot change instantaneously. As a result, the primary side current will flow through the parasitic capacitors of Q1 and Q3. The flow of the primary side current through both parasitic capacitors may cause the voltage at the junction between Q1 and Q3 to be discharged to zero, enabling a zero voltage switching when Q3 is turned on without substantial power loss. Similarly, the phase shift operation may enable lossless turn-on of other switches, namely Q1, Q2 and Q4.

SUMMARY OF THE INVENTION

These and other problems are generally solved or circumvented, and technical advantages are generally achieved, by preferred embodiments of the present invention which provide a system, apparatus and method for reducing the current and voltage stress of a bridge converter.

In accordance with an embodiment, an apparatus comprises a first power source, a low power converter having an input coupled to the first power source and an output connected in series with the first power source, a selection network coupled to the first power source and the output of the low power converter and a main isolated power converter coupled to the selection network.

In accordance with an embodiment, a system comprises a first power source, a low power converter having an input coupled to the first power source and an output connected in series with the first power source, a selection network coupled to the first power source and the output of the low power converter, a first main isolated power converter coupled to the selection network and a second main isolated power converter coupled the selection network.

In accordance with another embodiment, a method comprises providing power from a first power source coupled to a low power converter, converting an output of the first power source to a first auxiliary voltage source connected in series with the first power source, applying a first combination of the first power source and the first auxiliary voltage source to an unregulated power converter during a first half cycle and applying a second combination of the first power source and the first auxiliary voltage source to the unregulated power converter during a second half cycle.

An advantage of a preferred embodiment of the present invention is reducing the switching and conduction losses of a hybrid dc/dc converter so as to improve the hybrid dc/dc converter's efficiency.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a hybrid full bridge converter. The invention may also be applied, however, to a variety of isolated dc/dc converters including half bridge converters, full bridge converters, push-pull converters and the like. In addition, the invention may be applied to power conversion topologies with a variety of control mechanisms such as PWM duty cycle control, symmetrical PWM, asymmetrical PWM, phase shift PWM, variable frequency PWM control, a combination of phase shift PWM and variable frequency PWM, constant on time control, constant off time control or any combination thereof.

Figure 2A:
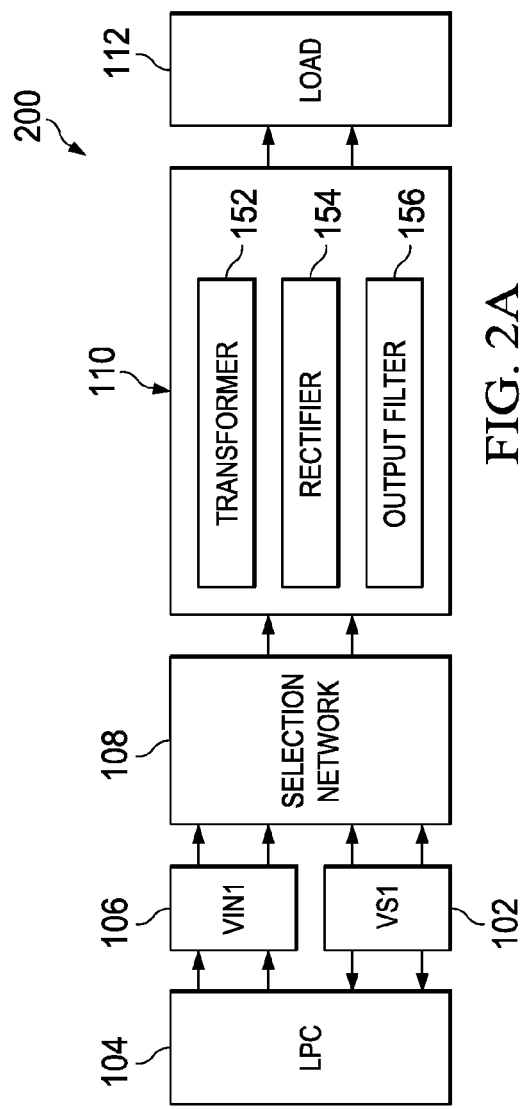
FIG. 2A illustrates a block diagram of a hybrid dc/dc converter in accordance with an embodiment.

Referring initially to FIG. 2A, a block diagram of a hybrid dc/dc converter is illustrated in accordance with an embodiment. The hybrid dc/dc converter 200 comprises a first dc voltage source 102, a low power converter 104, a second dc voltage source 106, a selection network 108 and a main power converter 110. As shown in FIG. 2A, the first dc voltage source 102 is coupled to the selection network 108 as well as the low power converter 104. The low power converter 104 converts the first dc voltage source 102 to a different voltage level so as to generate the second dc voltage source 106. In accordance with an embodiment, the low power converter 104 may be a non-isolated dc/dc converter such as buck dc/dc converters, boost dc/dc converters, buck-boost dc/dc converters and the like. Alternatively, the low power converter 104 may be an isolated dc/dc converter such as forward converters, flyback converters, half bridge converters, full bridge converters, push-pull converters and the like.

It should be noted that when the low power converter 104 may employ an isolated power topology (e.g., forward converters), the output voltage of the low power converter 104 is floating from the first dc voltage source 102. As such, the second dc voltage source 106 can be either added into or subtracted from the first dc voltage source 102 by a connection network provided by the selection network 108. On the other hand, when the low power converter 104 employs a non-isolated power topology (e.g., a buck dc/dc converter or a boost dc/dc converter), the low power converter 104 can only increase or decrease the first dc voltage source 102 by connecting the first dc voltage source 102 and the second dc voltage source 106 in series. More particularly, if the low power converter 104 is a buck dc/dc converter, the total output of combining the first dc voltage source 102 and the second dc voltage source 106 may be less than the output voltage of the first dc voltage source 102. In contrast, if the low power converter 104 is a boost dc/dc converter, the total output of combining the first dc voltage source 102 and the second dc voltage source 106 may be greater than the output voltage of the first dc voltage source 102.

It should further be noted that the low power converter 104 may process a small amount of power delivered to the main power converter 110. As described above with respect to the operation of the hybrid dc/dc converter, the output voltage of the low power converter 104 is used as an auxiliary power source to adjust the output voltage of the main power converter 110, which is an unregulated converter operating in a 50% duty cycle mode. Because the low power converter 104 may only process a fraction of the total power delivered to the load, the low power converter 104 may employ switches with smaller die size. In addition, when the low power converter 104 is an isolated power converter, a soft switching control mechanism may be employed to further reduce the switching losses so as to make the low power converter 104 operating at a higher frequency. Such a higher frequency helps to further reduce the size of the low power converter 104.

The selection network 108 may comprise a plurality of switches. In accordance with the operation principles of the hybrid dc/dc converter 200, the selection network 108 may connect the first dc voltage source 102 with the second dc voltage source 106 and further connect the combination of the first dc voltage source 102 and the second dc voltage source 106 with the main power converter 110. Alternatively, the selection network 108 may connect the first dc voltage source 102 directly to the main power converter 110 to magnetically reset the transformer winding of the main power converter 110. The detailed description of an embodiment of the selection network 108 will be described below with respect to FIG. 3A and FIG. 3B.

In accordance with an embodiment, the main power converter 110 may be an unregulated isolated dc/dc converter. In other words, the main power converter 110 may operate in a fixed duty cycle mode. More particularly, in order to magnetically reset the transformer of the isolated power converter, the main power converter 110 may have the same turn-on period in the first half cycle and the second half cycle. For example, the main power converter 110 may operate in a 50% duty cycle mode to achieve an unregulated output voltage as well as a magnetic reset of the transformer. One advantageous feature of an unregulated main power converter 110 is that the 50% duty cycle mode helps to reduce the magnetic losses from the transformer of the main power converter 110. Another advantageous feature is that the secondary synchronous rectifier may be better driven when the main power converter 110 operates in a 50% duty cycle mode. In sum, an unregulated main power converter 110 helps to reduce switching and conduction losses as well as electromagnetic interference (EMI) noise.

The main power converter 110 may comprise a transformer 152, a rectifier 154 and an output filter 156. In addition, depending on the topology, the main power converter 110 may further comprise a soft switching network formed by an auxiliary inductor and a resonant capacitor. Alternatively, for some isolated topologies such as a PWM switching full bridge dc/dc converter, an anti-saturation dc current blocking capacitor may be included in the main power converter 110. It should be noted that through the description, various embodiments are described based upon a full bridge dc/dc conversion topology. However, a person skilled in the art will recognize that the various embodiments described below are further applicable to other isolation topologies such as forward converters, flyback converters, half bridge converters, push-pull converters and the like.

The transformer 152 provides electrical isolation between the primary side and the secondary side of the main power converter 110. In accordance with an embodiment, the transformer 152 may be formed of two transformer windings, namely a primary transformer winding and a secondary transformer winding. Alternatively, the transformer 152 may have a center tapped secondary so as to have three transformer windings including a primary transformer winding, a first secondary transformer winding and a second secondary transformer winding. It should be noted that the transformers illustrated herein and throughout the description are merely examples, which should not unduly limit the scope of the claims. One of ordinary skill in the art would recognize many variations, alternatives, and modifications. For example, the transformer 108 may further comprise a variety of bias windings and gate drive auxiliary windings.

The rectifier 154 converts an alternating polarity waveform received from the output of the transformer 152 to a single polarity waveform. The rectifier 154 may be formed of a pair of switching elements such as n-type metal oxide semiconductor (NMOS) transistors. Alternatively, the rectifier 154 may be formed of a pair of diodes. Furthermore, the rectifier 154 may be formed by other types of controllable devices such as metal oxide semiconductor field effect transistor (MOSFET) devices, bipolar junction transistor (BJT) devices, super junction transistor (SJT) devices, insulated gate bipolar transistor (IGBT) devices and the like. The detailed operation and structure of the rectifier 154 are well known in the art, and hence are not discussed herein.

The output filter 156 is used to attenuate the switching ripple of the main power converter 110. According to the operation principles of isolated dc/dc converters, the output filter 156 may be an L-C filter formed by an inductor and a plurality of capacitors. One person skilled in the art will recognize that some isolated dc/dc converter topologies such as forward converters may require an L-C filter. On the other hand, some isolated dc/dc converter topologies such as LLC resonant converters may include an output filter formed by a capacitor. One person skilled in the art will further recognize that different output filter configurations apply to different power converter topologies as appropriate. The configuration variations of the output filter 156 are within various embodiments of the present disclosure.

Figure 2B:
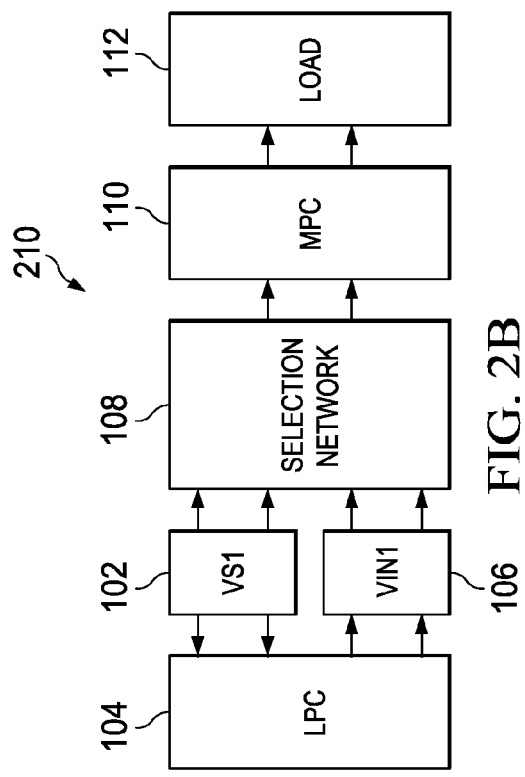
FIG. 2B illustrates a block diagram of a hybrid dc/dc converter in accordance with another embodiment.

FIG. 2B illustrates a block diagram of a hybrid dc/dc converter in accordance with another embodiment. The hybrid dc/dc converter 210 is similar to the hybrid dc/dc converter 200 shown in FIG. 2A except that the first dc voltage source 102 and the second dc voltage source 106 are swapped. More particularly, in FIG. 2A, the selection network 108 may connect the first dc voltage source 102 and the second dc voltage source 106 together in a configuration that the second dc voltage source 106 is on top of the first dc voltage source 102. In contrast, by swapping the first dc voltage source 102 and the second dc voltage source 106, the first dc voltage source 102 may be on top of the second dc voltage source 106 through a connection path provided by the selection network 108.

Figure 3A:
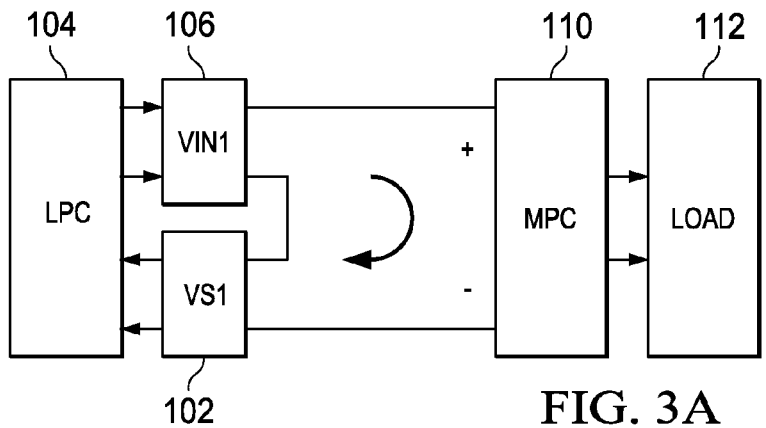
FIG. 3A illustrates a block diagram of a first half cycle system configuration of the hybrid dc/dc converter shown in FIG. 2A in accordance with an embodiment.

FIG. 3A illustrates a block diagram of a first half cycle system configuration of the hybrid dc/dc converter shown in FIG. 2A in accordance with an embodiment. During a first half cycle, the selection network 108 is configured such that the first dc voltage source 102 and the second dc voltage source 106 are connected in series. In addition, the series connected power sources (e.g., 102 and 106) are further applied to the primary side of the transformer 152 of the main power converter 110. As indicated by the curved arrow, the current flows from the positive terminal of the second dc voltage source 106 to the main power converter 110, and then flows back to the negative terminal of the first dc voltage source 102. It should be noted that the low power converter 104 has a control loop independent from the main power converter 110. In other words, the low power converter 104 is used to maintain a regulated voltage at the second dc voltage source 106. As a result, although the main power converter 110 is unregulated, the output of the main power converter 110 may be regulated accordingly by regulating the output voltage of the second dc voltage source 106.

Figure 3B:
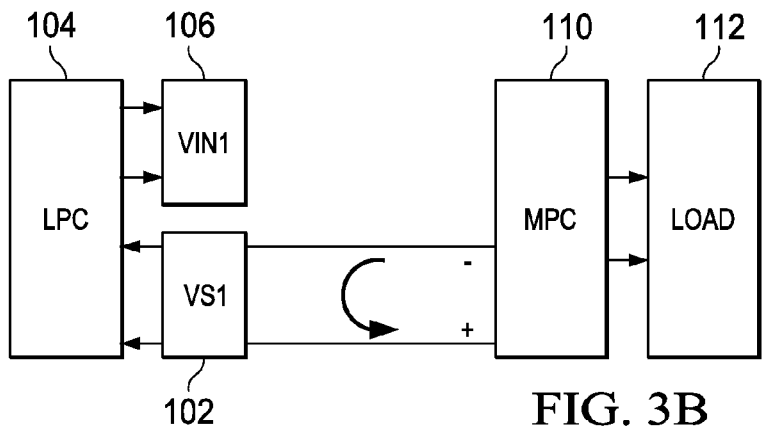
FIG. 3B illustrates a block diagram of a second half cycle system configuration of the hybrid dc/dc converter shown in FIG. 2A in accordance with an embodiment.

FIG. 3B illustrates a block diagram of a second half cycle system configuration of the hybrid dc/dc converter shown in FIG. 2A in accordance with an embodiment. During the second half cycle, the selection network 108 is configured such that the first dc voltage source 102 is applied to the primary side of the main power converter 110. As indicated by the curved arrow, the current flows from the negative terminal of the first dc voltage source 102 to the positive terminal of the main power converter 110, and then flows back to the positive terminal of the first dc voltage source 102.

Figure 3C:
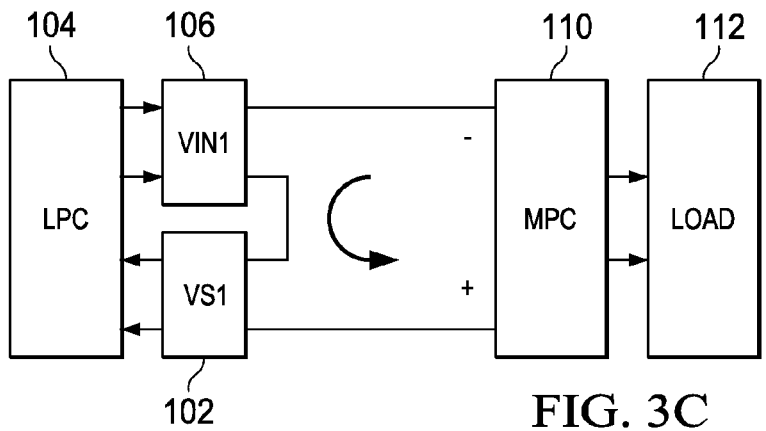
FIG. 3C illustrates a block diagram of a second half cycle system configuration of the hybrid dc/dc converter shown in FIG. 2A in accordance with another embodiment.

FIG. 3C illustrates a block diagram of a second half cycle system configuration of the hybrid dc/dc converter shown in FIG. 2A in accordance with another embodiment. During the second half cycle, the selection network 108 is configured such that the first dc voltage source 102 and the second dc voltage source 106 are connected in series and further applied to the primary side of the transformer 152 (not shown) of the main power converter 110. As indicated by the curved arrow, the current flows from the positive terminal of the second dc voltage source 106 to the negative terminal of the main power converter 110, and then flows back to the negative terminal of the first dc voltage source 102.

Figure 4A:
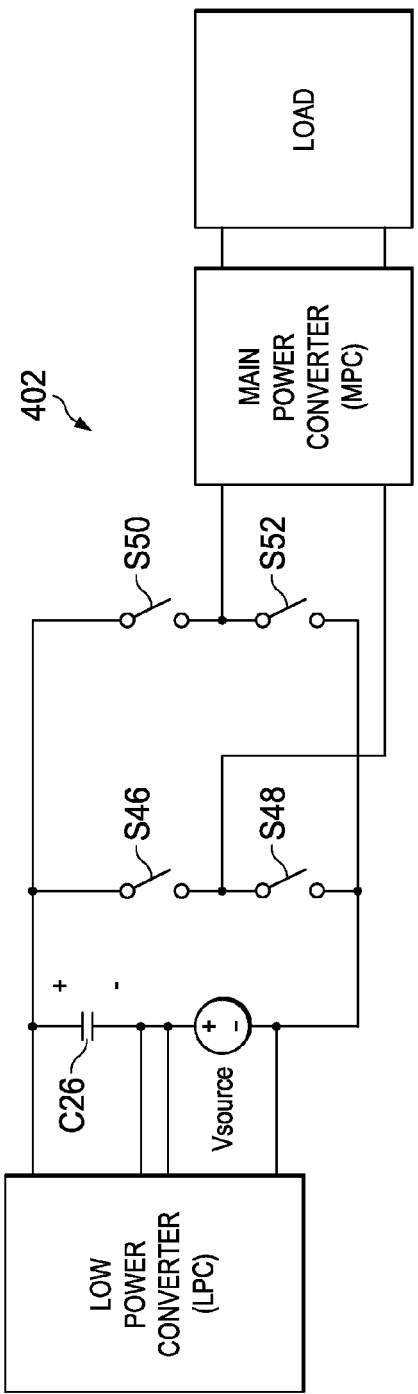
FIG. 4A illustrates a schematic diagram of the hybrid dc/dc converter shown in FIG. 2A in accordance with an embodiment.

FIG. 4A illustrates a schematic diagram of the hybrid dc/dc converter shown in FIG. 2A in accordance with an embodiment. As shown in FIG. 4A, the selection network 108 is actually the primary side switching network of a full bridge power converter. The main power converter 110 in FIG. 4A can be considered having two portions. Along the isolation barrier provided by the transformer 152 (not shown), the left side of the transformer 152 into which power flows is called the primary side and the circuit connected to the primary side winding is called the primary circuit of the hybrid dc/dc converter 402. In accordance with an embodiment, the primary side switching network of the hybrid dc/dc converter 402 can be alternatively used as the selection network 108. On the other hand, the right side of the transformer 152 from which power flows is called the secondary side, and the circuit connected to the secondary side winding is called the secondary circuit of the hybrid dc/dc converter 402. The function of the primary side's circuit has been described in detail with respect to FIG. 2, and therefore not discussed herein.

Figure 4B:
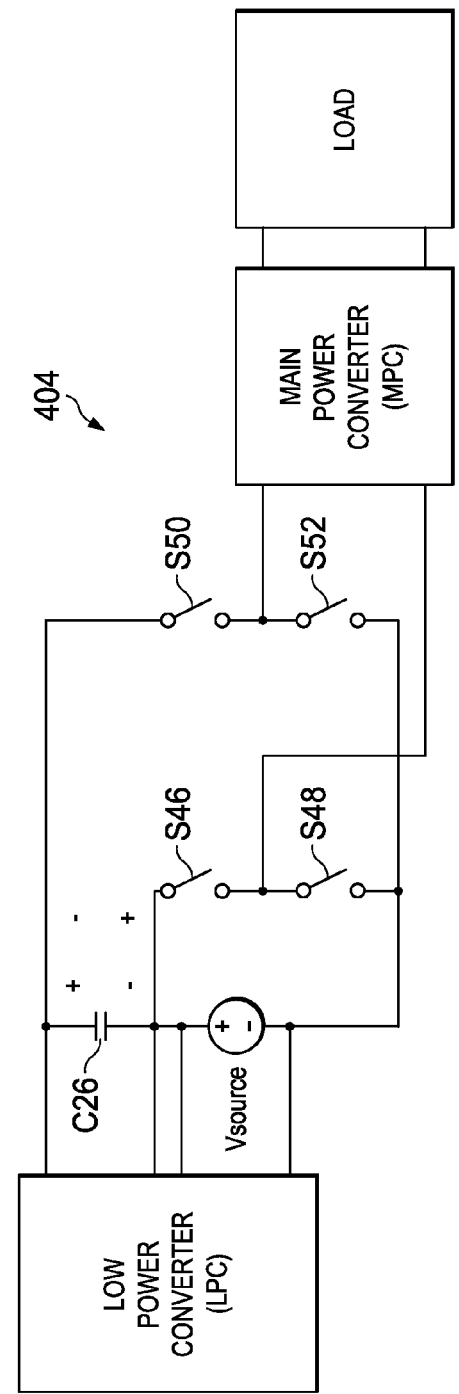
FIG. 4B illustrates a schematic diagram of the hybrid dc/dc converter shown in FIG. 2A in accordance with another embodiment.

FIG. 4B illustrates a schematic diagram of the hybrid dc/dc converter shown in FIG. 2A in accordance with another embodiment. As shown in FIG. 4B, the selection network 108 is similar to the primary side switching network of FIG. 4A. In comparison with FIG. 4A, switch S46 is tied to the joint point between C26 and Vsource. Such a configuration change makes Vsource as the resetting source during the second half cycle. As a result, the current stress of the low power converter 104 may be reduced. The operation details of the hybrid dc/dc converter 404 shown in FIG. 4B will be described below with respect to FIG. 5A and FIG. 5B.

Figure 5A:
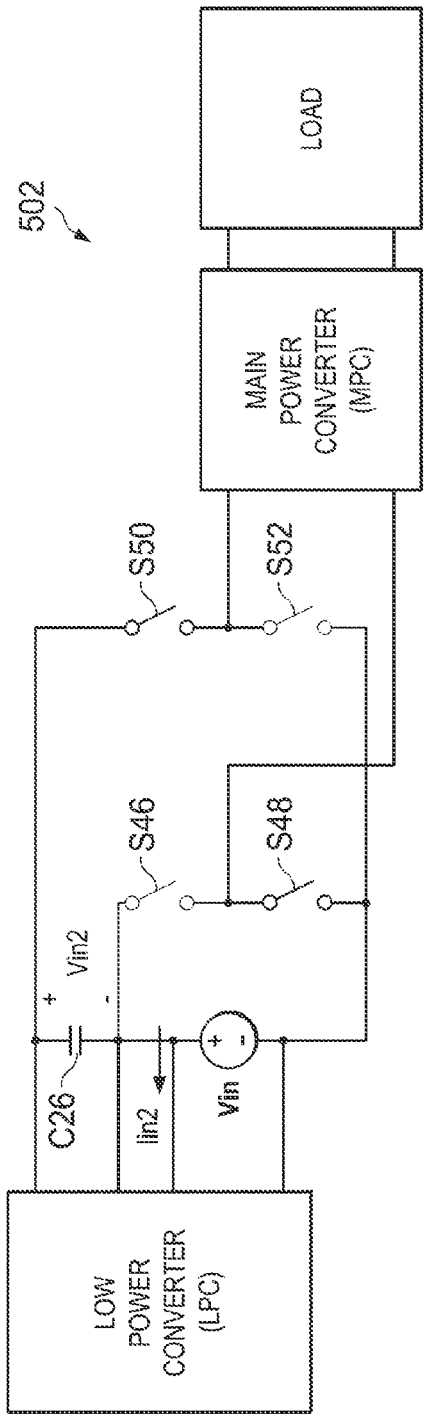
FIG. 5A illustrates a schematic diagram of a first half cycle system configuration of the hybrid dc/dc converter shown in FIG. 4B.

FIG. 5A illustrates a schematic diagram of a first half cycle system configuration of the hybrid dc/dc converter shown in FIG. 4B. During the first half cycle, the series connected voltage sources are applied to the primary transformer winding of the main power converter through the turn-on of switch S50 and switch S48. During the first half cycle, the lower power converter is enabled and the energy from the first dc voltage source is delivered to the capacitor C26 so as to maintain a regulated voltage at C26. Moreover, by adjusting the voltage across the capacitor C26, the hybrid dc/dc converter 502 can regulate the output voltage of the main power converter.

Figure 5B:
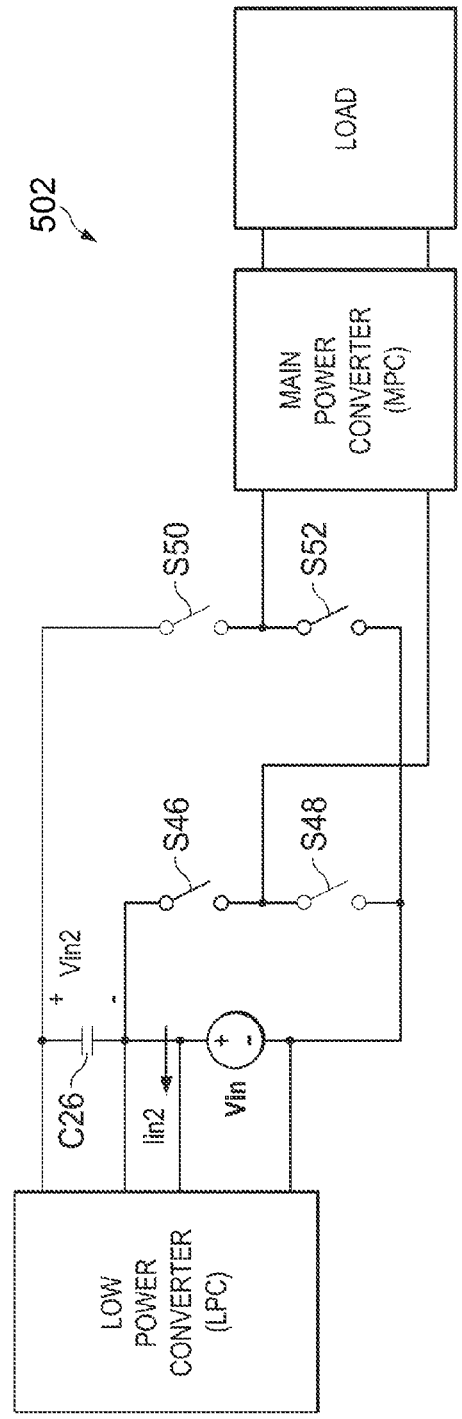
FIG. 5B illustrates a schematic diagram of a second half cycle system configuration of the hybrid dc/dc converter shown in FIG. 4B.

FIG. 5B illustrates a schematic diagram of a second half cycle system configuration of the hybrid dc/dc converter shown in FIG. 4B. During the second half cycle, the first dc voltage source is applied to the primary transformer winding through the turn-on of switch S46 and switch S52. As a result, the transformer of the main power converter is magnetically reset and energy is transferred from the primary side to the secondary side. It should be noted that during the second half cycle, the low power converter is inactive because the capacitor C26 is disconnected from the main power converter. As a result, the current stress of the low power converter is reduced. It should be noted that the system configurations shown in FIG. 5A and FIG. 5B is not a two-stage power conversion topology. Instead, there may be one single stage during the second half cycle. Therefore, the power topology shown in FIG. 5A and FIG. 5B may be alternatively referred to as a one and half stage power conversion topology.

The low power converter shown in FIG. 5A and FIG. 5B may process a small amount of power delivered to the main power converter. In accordance with an embodiment, the power processed by the low power converter may be described as follows:

$$P_{LPC} = \frac{V_{IN2} \cdot P_O}{2 \cdot V_{IN} + V_{IN2}}$$

where $P_{LPC}$ is the power processed by the low power converter and $P_O$ is the output power of the main power converter. Moreover, the current flowing through the low power converter is reduced accordingly. In accordance with an embodiment, the current flowing through the low power converter may be described as follows:

$$I_{IN2} = \frac{V_{IN2} \cdot P_O}{V_{IN} \cdot (2 \cdot V_{IN} + V_{IN2})}$$

Figure 1:
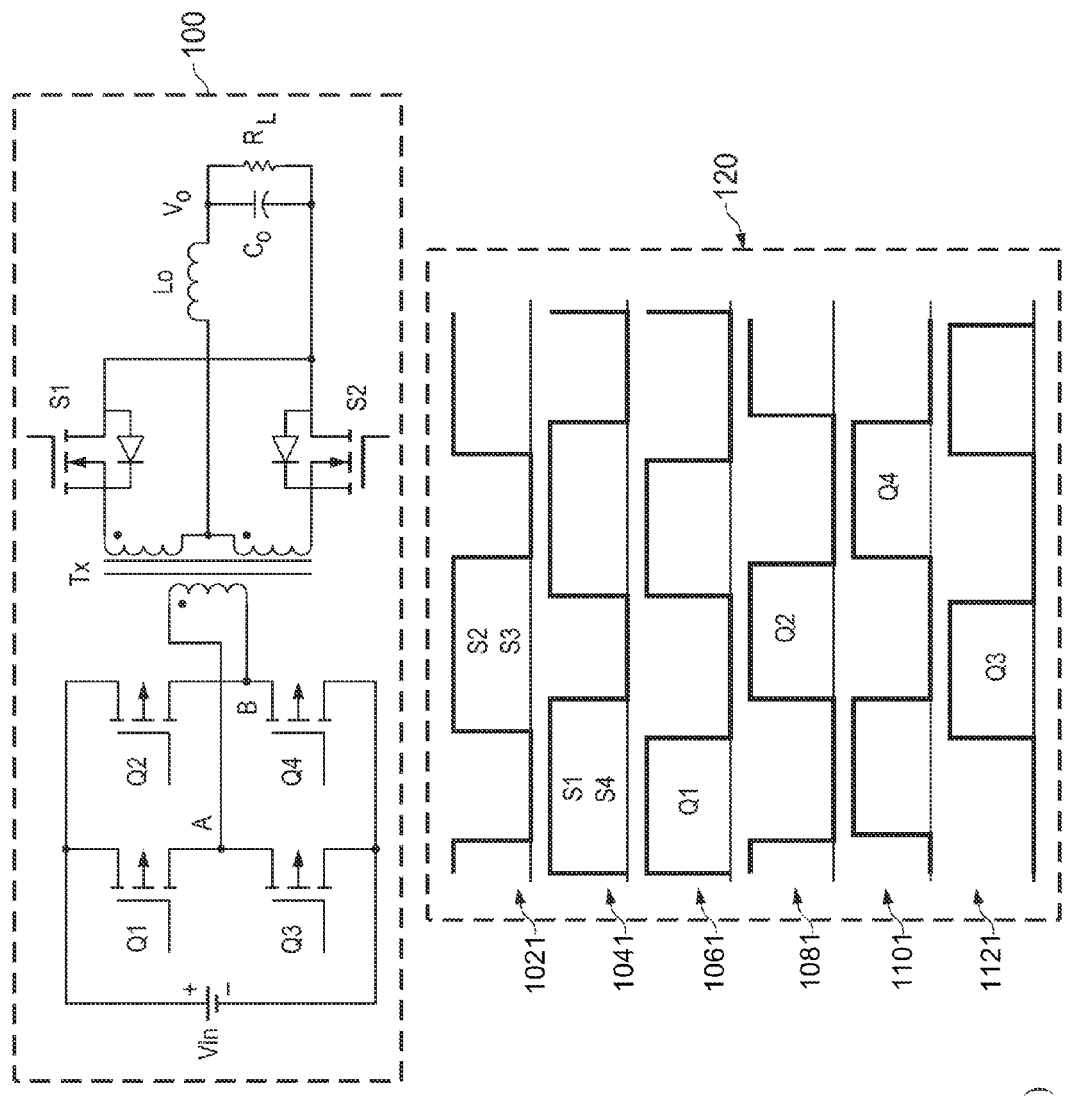
FIG. 1 illustrates a full bridge converter having a full wave rectifier.
Figure 6A:
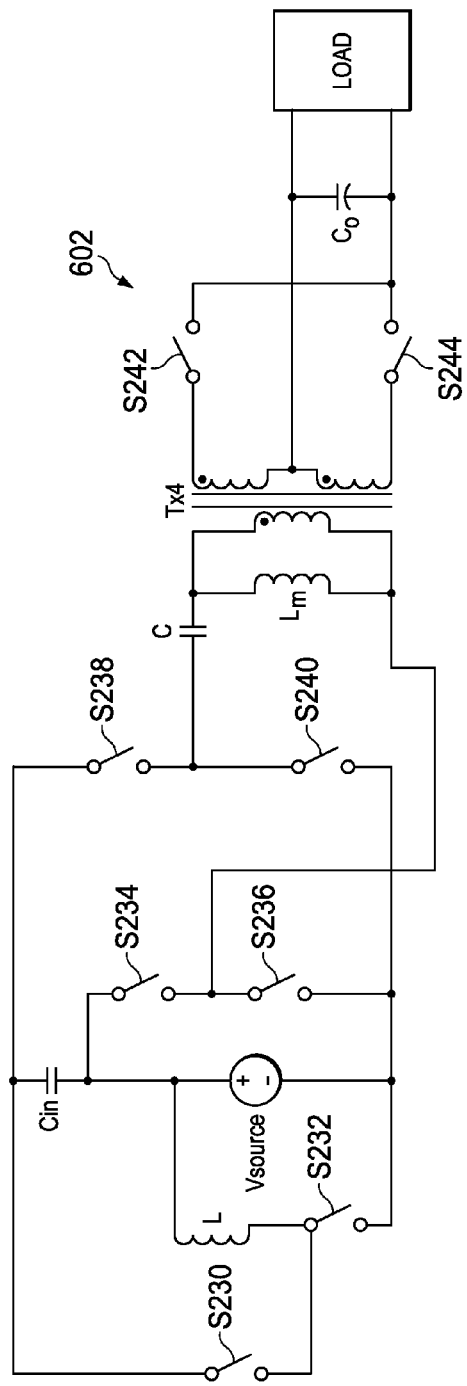
FIG. 6A illustrates in detail a schematic diagram of the hybrid dc/dc converter shown in FIG. 4B in accordance with an embodiment.

FIG. 6A illustrates in detail a schematic diagram of the hybrid dc/dc converter shown in FIG. 4B in accordance with an embodiment. As shown in FIG. 6A, the main power converter is implemented by a PWM switching full bridge converter. The transformer is a center tapped transformer coupled between the primary side switching network and the second side switching network. The primary side switching network includes four switches, namely S234, S236, S238 and S240. In addition, the primary side switching network includes a dc current block capacitor C, which is connected in series with the primary winding of the transformer $T_{x4}$ having a magnetizing inductance Lm. The secondary side employs a synchronous rectifier formed by switches S242 and S244. In fact, the main power converter is a full bridge dc/dc converter. The operation of a full bridge dc/dc converter has been described in detail with respect to FIG. 1, and hence is not discussed in further detail herein.

It should be noted that the power topology of the hybrid dc/dc converter 602 may be not only applied to a full bridge converter having a center-tapped secondary winding as shown in FIG. 6, but also applied to a full bridge converter having a non center-tapped secondary winding. Furthermore, the power topology of the hybrid dc/dc converter 602 is applicable to bridge converters having other secondary configurations, such as voltage doubler rectifiers and current doubler rectifiers. In sum, the hybrid dc/dc converter can be applied to all types of isolated converters, including full bridge converters having different types of secondary configurations, and half bridge converters having different types of secondary configurations. Furthermore, different control techniques of bridge converters have no impact on the application of the hybrid dc/dc converter. For example, the hybrid dc/dc converter can be applied to a hard switching full bridge converter as well as a phase shift full bridge converter.

The low power converter shown in FIG. 6A employs a boost dc/dc conversion topology comprising an inductor L and switches S230 and S232. The control of the low power converter is independent from the control of the main power converter. In accordance with an embodiment, the clock signal for generating PWM signals of the low power converter may be in sync with the clock signal for generating PWM signals of the main power converter so that the ripple voltage as well as the input filter can be reduced. The operation principles of boost dc/dc converters are well known in the art, and hence are not discussed in further detail herein.

Figure 6B:
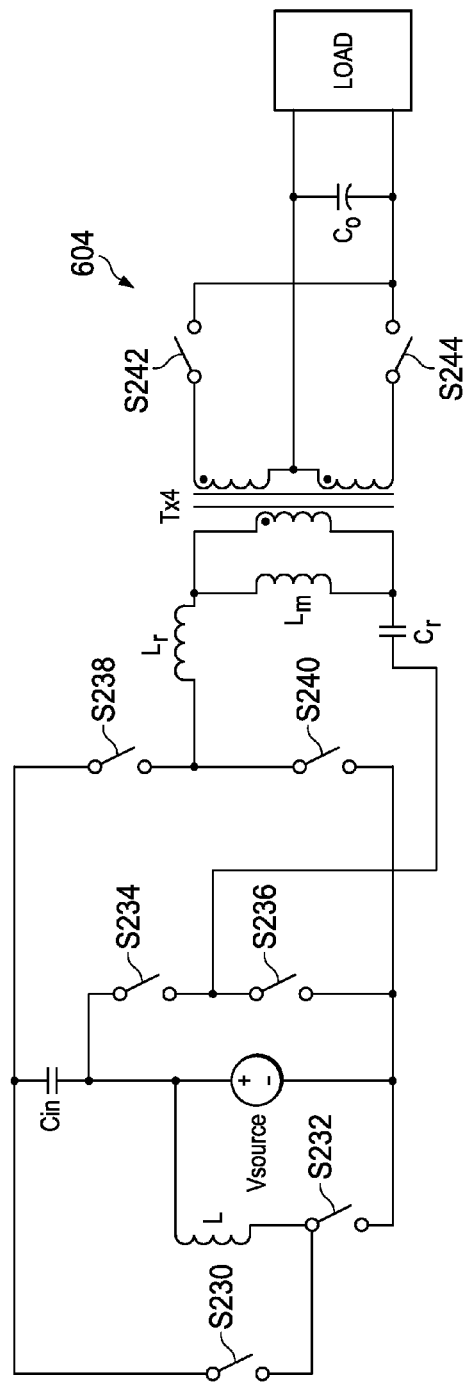
FIG. 6B illustrates in detail a schematic diagram of the hybrid dc/dc converter shown in FIG. 4B in accordance with another embodiment.

FIG. 6B illustrates in detail a schematic diagram of the hybrid dc/dc converter shown in FIG. 4B in accordance with another embodiment. The power topology shown in FIG. 6B is similar to the power topology shown in FIG. 6A except that the main power converter in FIG. 6B employs a soft switching full bridge power conversion topology. As known in the art, the resonant tank formed by Lr and Cr helps to reduce the switching losses of the main power converter so that the efficiency of the hybrid dc/dc converter can be further improved. The operation principles of soft switching full bridge converters are well known in the art, and hence are not discussed in further detail herein.

Figure 7:
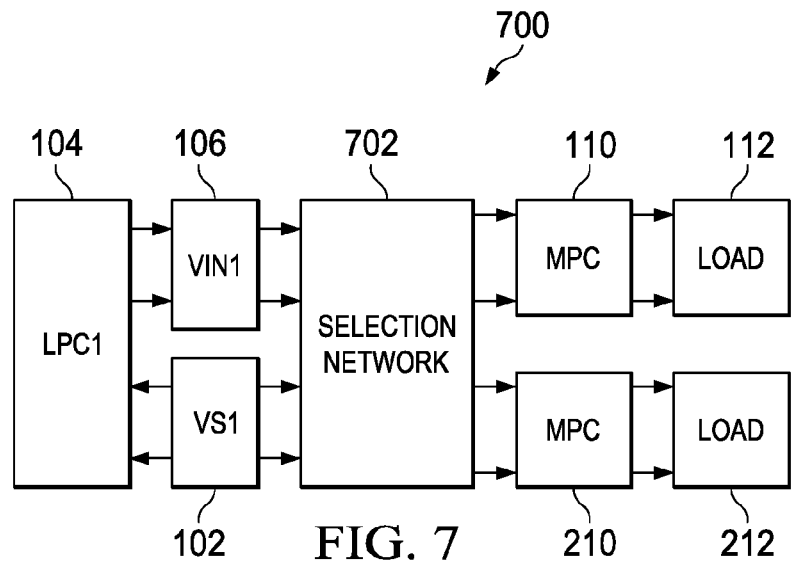
FIG. 7 illustrates a block diagram of a hybrid dc/dc converter in accordance with another embodiment.

FIG. 7 illustrates a block diagram of a hybrid dc/dc converter in accordance with another embodiment. The hybrid dc/dc converter 700 shown in FIG. 7 is similar to the hybrid dc/dc converter 200 shown in FIG. 2A except that the main power converter employs a multiple output structure. As shown in FIG. 7, the selection network 702 is coupled to the first main power converter 110 and the second main power converter 210 respectively. The system configuration of the first main power converter 110 and the second main power converter 210 is similar to the system configurations shown in FIG. 6A and FIG. 6B, and hence is not discussed in further detail herein to avoid unnecessary repetition.

It should be noted that there may be a variety of isolated power conversion topologies. The first main power converter 110 and the second main power converter 210 may share the same power conversion topology. Alternatively, the first main power converter 110 and the second main power converter 210 may employ different power topologies. For example, the first main power converter 110 may employ a PWM switching full bridge dc/dc converter. In contrast, the second main power converter 210 may employ a soft switching full bridge dc/dc converter.

Figure 8:
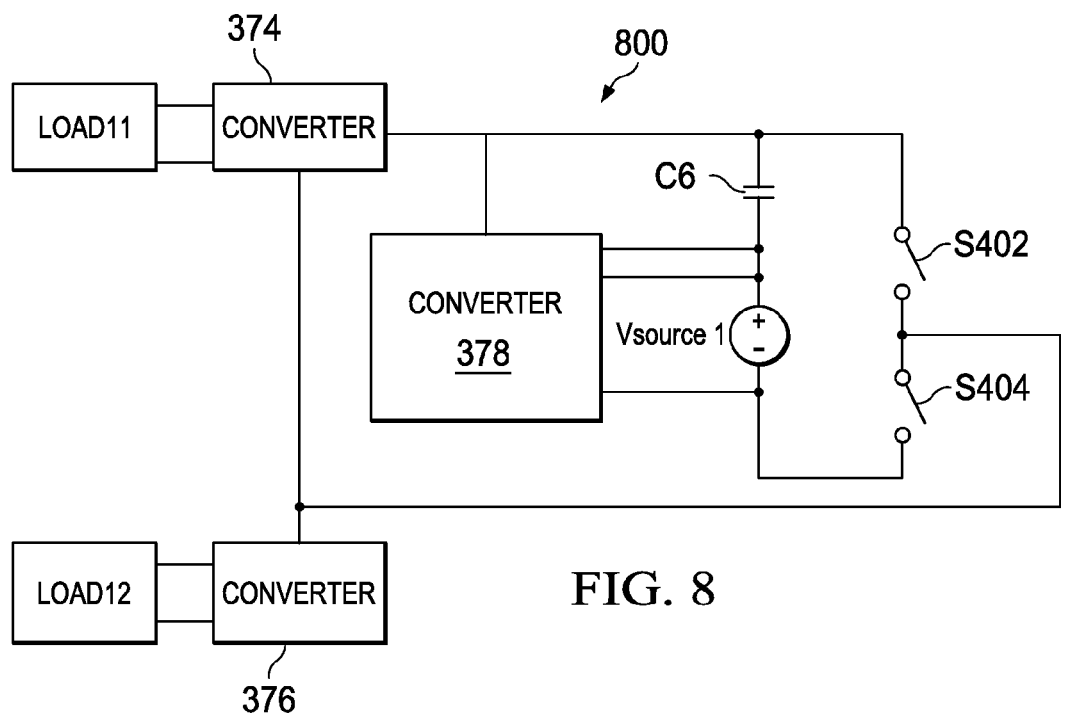
FIG. 8 illustrates a schematic diagram of the selection network shown in FIG. 7 in accordance with an embodiment.

FIG. 8 illustrates a schematic diagram of the selection network shown in FIG. 7 in accordance with an embodiment. The selection network 702 comprises a first switch S402 and a second switch S404 connected in series. The selection network 702 is coupled to the input dc source Vsource1 as well as the capacitor C6. By controlling the turn-on and turn-off of S402 and S404, the output voltages of the converter 374 and the converter 376 are regulated respectively. The detailed operation of the dual output hybrid dc/dc converter will be described below with respect to FIG. 9.

Figure 9:
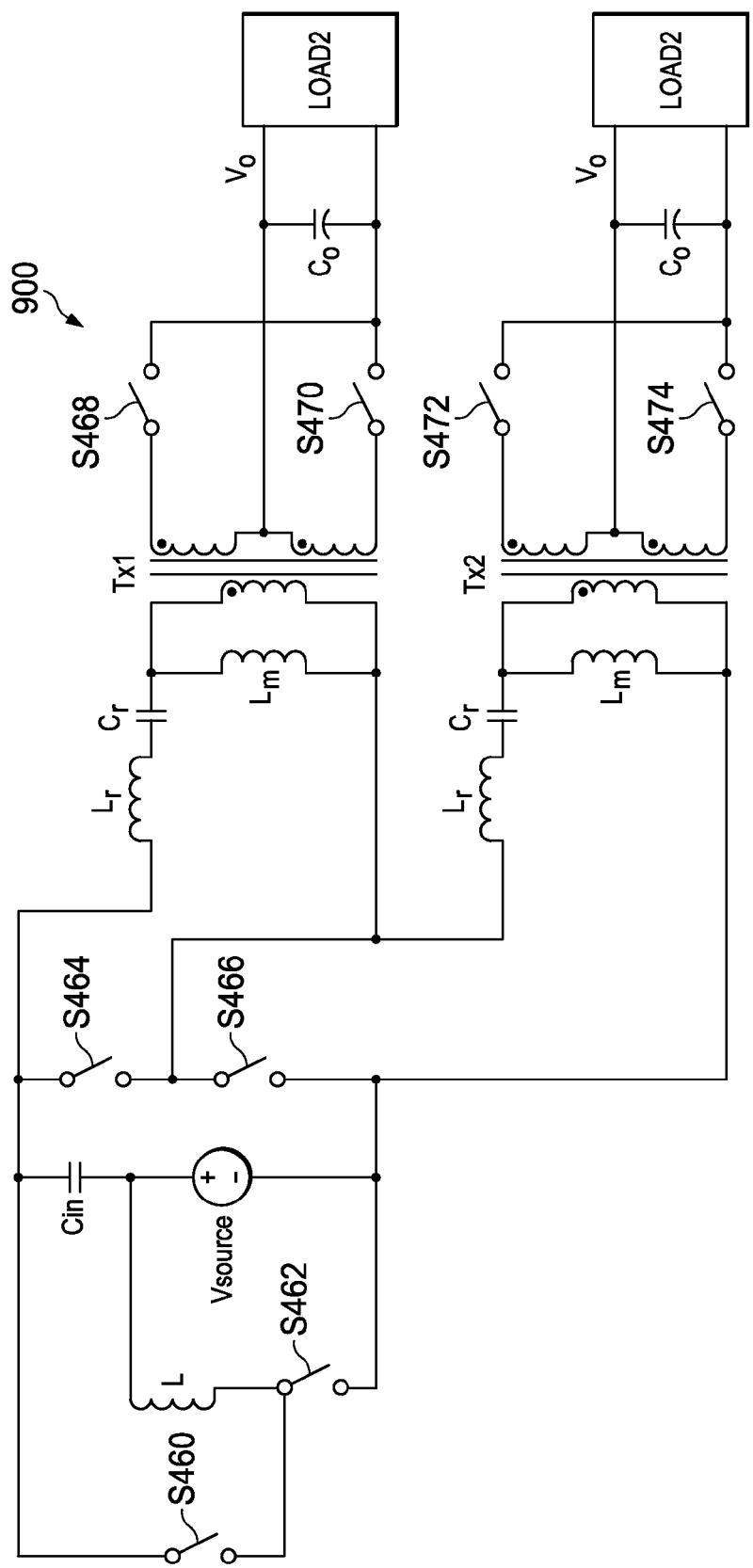
FIG. 9 illustrates a schematic diagram of the dual output hybrid dc/dc converter shown in FIG. 7 in accordance with an embodiment.

FIG. 9 illustrates a schematic diagram of the dual output hybrid dc/dc converter shown in FIG. 7 in accordance with an embodiment. As shown in FIG. 9, the low power converter employs a boost dc/dc converter, which maintains a higher voltage at the positive terminal of the capacitor Cin. The power topology of the main power converter have been described above with respect to FIG. 6A and FIG. 6B, and hence is not discussed in detail herein. It should be noted that the first output may be regulated by adjusting the duty cycle of the low power converter. In addition, the first output may be regulated by adjusting the duty cycles of S464 and S466. In order to independently regulate the second output, a variable frequency control mechanism may be employed to adjust the output voltage of the second output.

Figure 10:
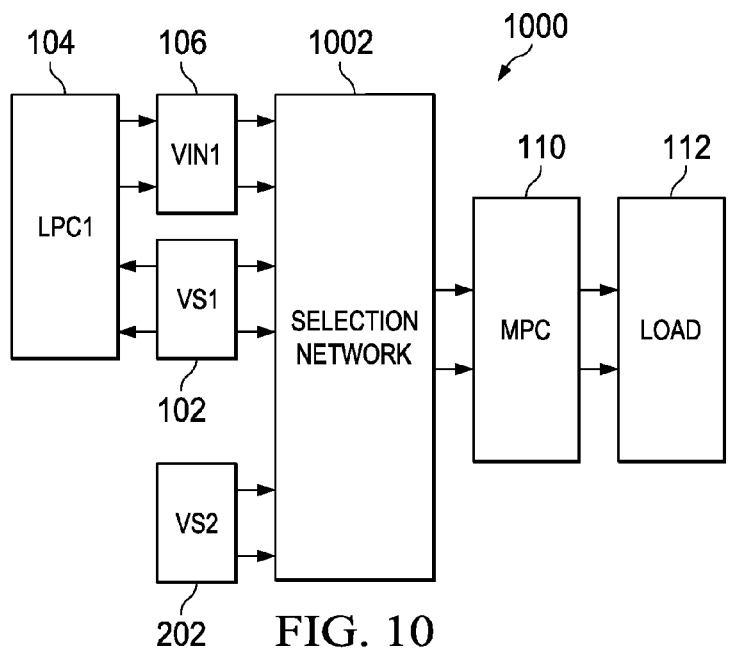
FIG. 10 illustrates a block diagram of a hybrid dc/dc converter in accordance with another embodiment.

FIG. 10 illustrates a block diagram of a hybrid dc/dc converter in accordance with another embodiment. The hybrid dc/dc converter 1000 shown in FIG. 10 is similar to the hybrid dc/dc converter 200 shown in FIG. 2A except that one more power supply is employed. As shown in FIG. 10, a third dc input voltage source 202 is coupled to the selection network 1002. In accordance with an embodiment, the third dc input voltage source 202 is similar to the first dc input voltage source 102. The detailed operation of the third dc input voltage source 202 will be described below with respect to FIG. 11A, FIG. 11B and FIG. 12.

Figure 11A:
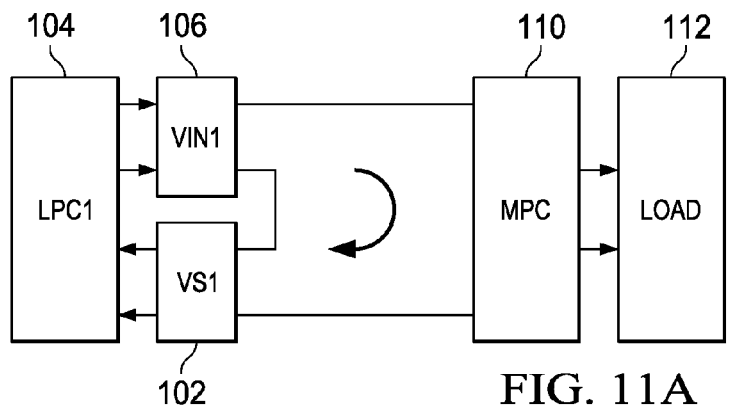
FIG. 11A illustrates a block diagram of a first half cycle system configuration of the hybrid dc/dc converter shown in FIG. 10 in accordance with an embodiment.
Figure 11B:
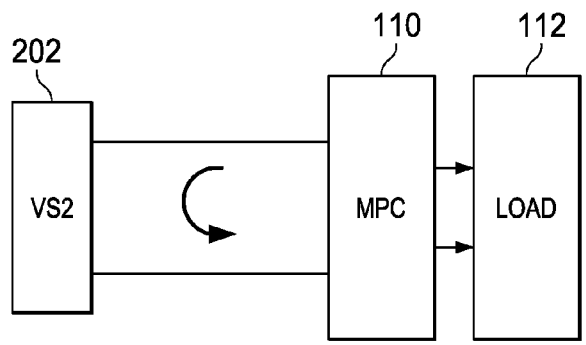
FIG. 11B illustrates a block diagram of a second half cycle system configuration of the hybrid dc/dc converter shown in FIG. 10 in accordance with an embodiment.

FIG. 11A illustrates a block diagram of a first half cycle system configuration of the hybrid dc/dc converter shown in FIG. 10 in accordance with an embodiment. During a first half cycle, the system configuration of the selection network is similar to that shown in FIG. 3A, and hence is not discussed in further detail to avoid unnecessary repetition. FIG. 11B illustrates a block diagram of a second half cycle system configuration of the hybrid dc/dc converter shown in FIG. 10 in accordance with an embodiment. The magnetic reset method shown in FIG. 11B is similar to that shown in FIG. 3B except that a third dc input voltage source 202 is used to magnetically reset the transformer of the main power converter 110. It will be appreciated that using a same power source during the first half cycle and the second half cycle or using a different power source during two cycles is choice of design and depends on different needs of various applications.

Figure 12:
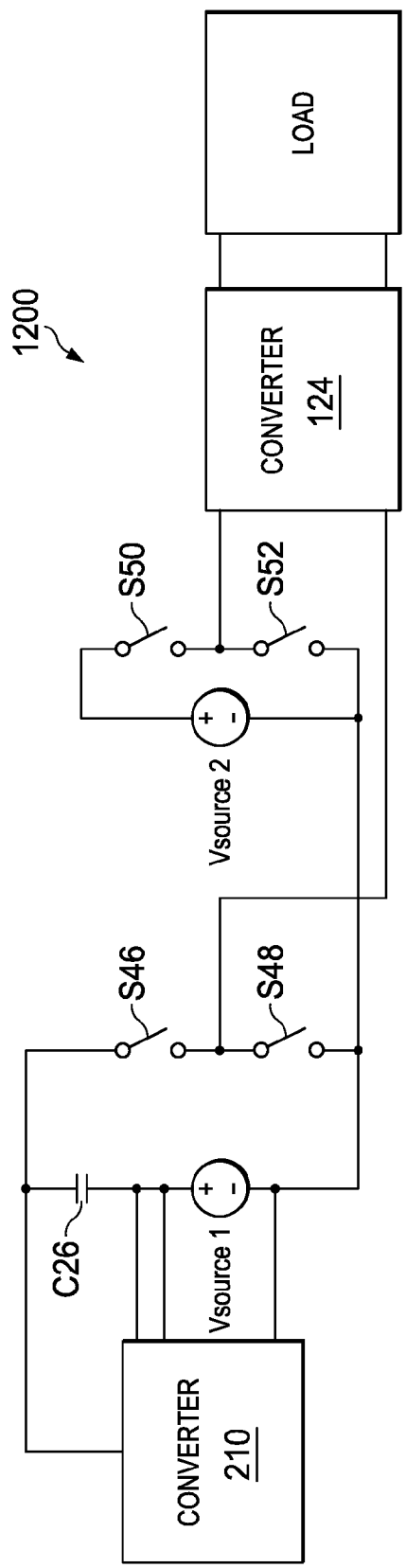
FIG. 12 illustrates a schematic diagram of the hybrid dc/dc converter shown in FIG. 10 in accordance with an embodiment.

FIG. 12 illustrates a schematic diagram of the hybrid dc/dc converter shown in FIG. 10 in accordance with an embodiment. The system configuration of FIG. 12 is similar to the system configuration shown in FIG. 5A. In the first half cycle, the system configuration of FIG. 12 is identical to that of FIG. 5A. In the second half cycle, a different dc voltage source Vsource2 is used to reset the transformer winding of the power converter 124. In contrast, in FIG. 5A and FIG. 5B, the first cycle and the second cycle share the same input voltage source.

Figure 13A:
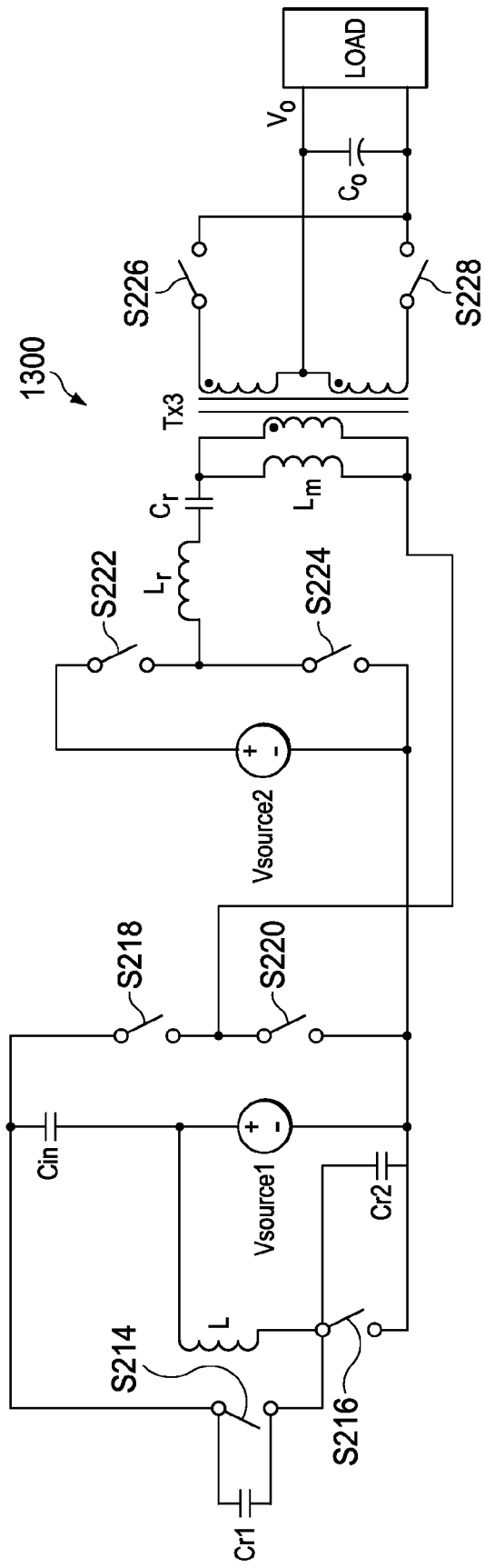
FIG. 13A illustrates in detail a schematic diagram of the hybrid dc/dc converter shown in FIG. 12 in accordance with an embodiment.

FIG. 13A illustrates in detail a schematic diagram of the hybrid dc/dc converter shown in FIG. 12 in accordance with an embodiment. As shown in FIG. 13, the low power converter employs two switches S214 and S216 and adjusts the voltage at the positive terminal of Cin by adjusting the duty cycles of S214 and S216 respectively. ZVS and ZCS can be achieved for S214 and S216 through a resonant process between the inductor L and two resonant capacitors Cr1 and Cr2. The detailed operation of ZVS and ZCS are well known in the art, and hence is not discussed in further detail herein. The ZVS and ZCS of the main power converter can also be achieved by controlling the turn-on and the turn-off of the main switches, S218, S220, S222 and S224. More particularly, the ZVS of the main switches can be achieved at any input voltage and output current conditions. Likewise, the ZCS can be achieved at the secondary side synchronous rectifier formed by S226 and S228.

Figure 13B:
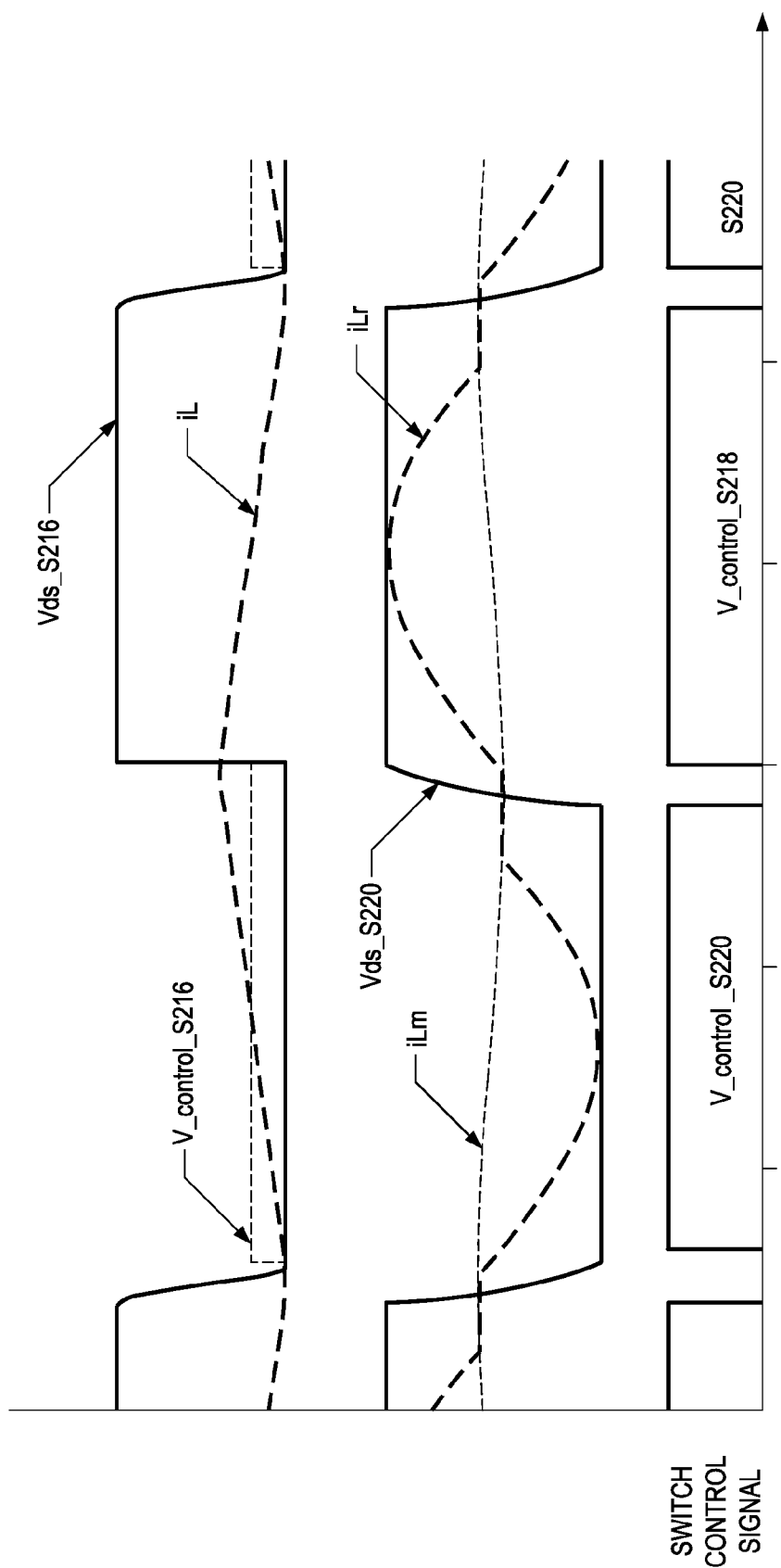
FIG. 13B illustrates waveforms of the hybrid dc/dc converter shown in FIG. 13A in soft switching operation according to an embodiment.

FIG. 13B illustrates waveforms of the hybrid dc/dc converter shown in FIG. 13A in soft switching operation according to an embodiment. As shown in FIG. 13B, the switch S216 can achieve a ZVS and ZCS transition by using the resonant process between the inductor L and the resonant capacitor Cr2. Likewise, the main switch S220 may achieve a ZVS and ZCS transition by using the resonant process between the resonant process between Lr and Cr. One advantageous of having a soft switching transition at the lower power converter and the main power converter is that such a soft switching transition helps to reduce switching losses so as to improve the efficiency of the hybrid dc/dc converter shown in FIG. 13A.

Figure 14:
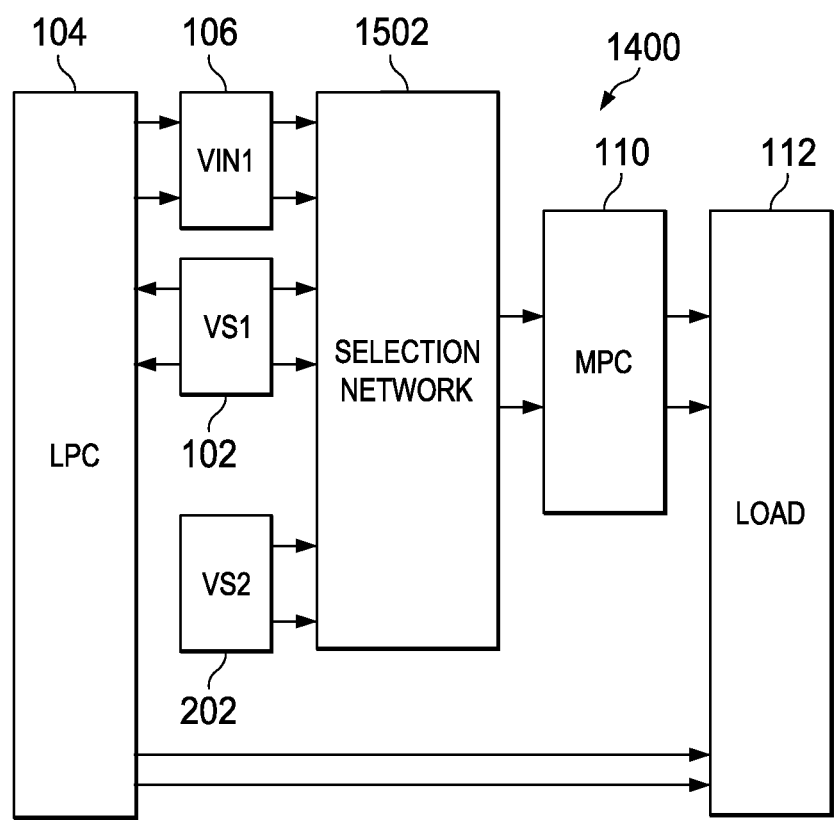
FIG. 14 illustrates a block diagram of a hybrid dc/dc converter in accordance with another embodiment.

FIG. 14 illustrates a block diagram of a hybrid dc/dc converter in accordance with another embodiment. The hybrid dc/dc converter 1400 shown in FIG. 14 is similar to the hybrid dc/dc converter 1000 shown in FIG. 10 except that the low power converter 104 in FIG. 14 not only maintains a regulated VIN1, but also provides energy to the load 112. The detailed operation of the hybrid dc/dc converter 1400 will be described in further detail with respect to FIG. 15 and FIG. 16.

Figure 15:
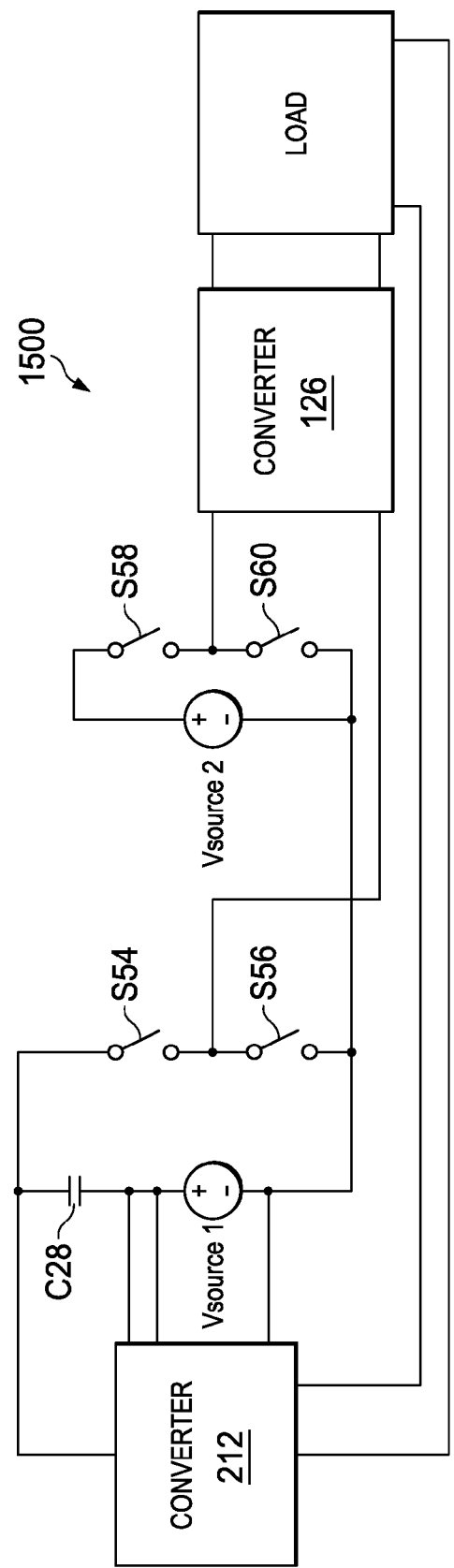
FIG. 15 illustrates a schematic diagram of the hybrid dc/dc converter shown in FIG. 14 in accordance with an embodiment.
Figure 16:
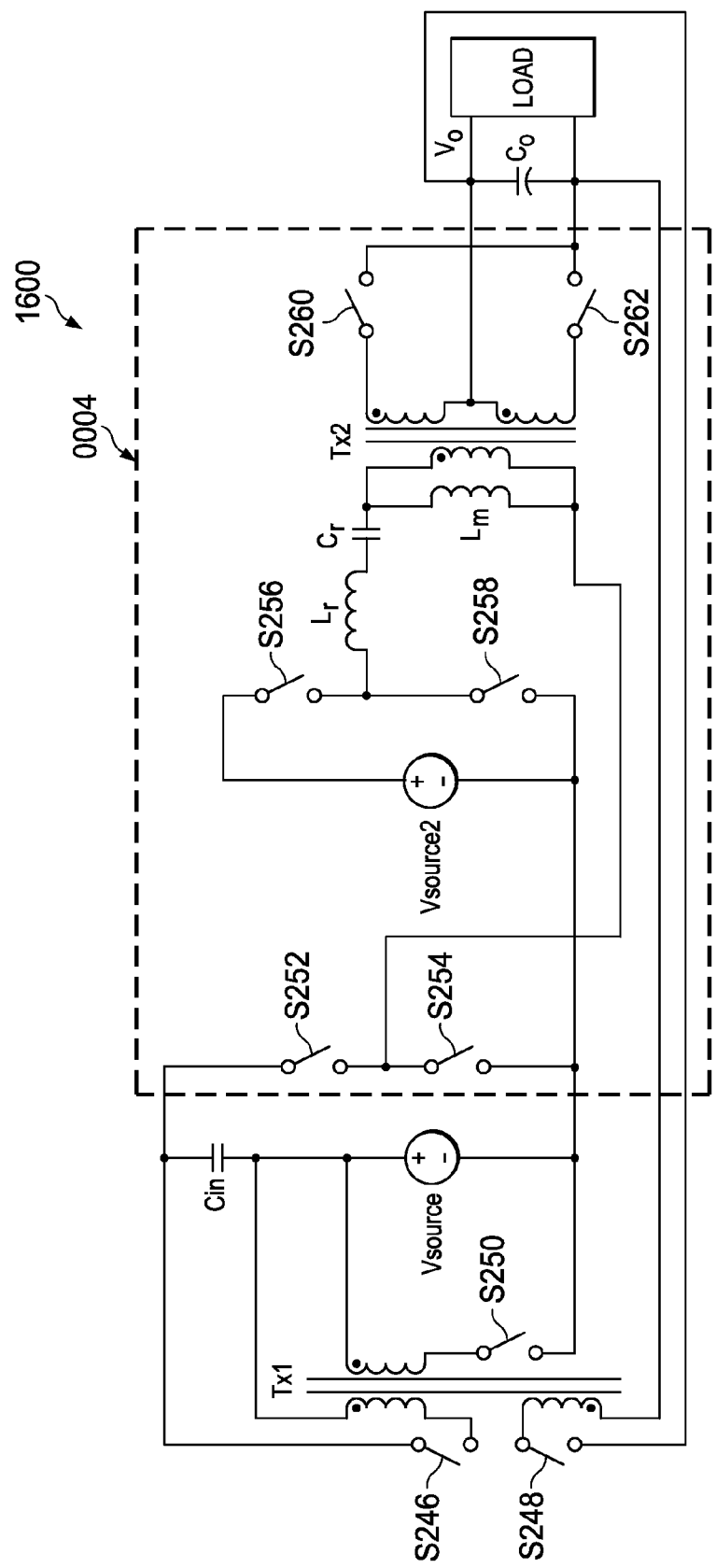
FIG. 16 illustrates in detail a schematic diagram of the hybrid dc/dc converter shown in FIG. 15 in accordance with an embodiment.

FIG. 15 illustrates a schematic diagram of the hybrid dc/dc converter shown in FIG. 14 in accordance with an embodiment. The system configuration of FIG. 15 is similar to the system configuration shown in FIG. 12 except that the low power converter 112 is coupled to the load directly. As such, the low power converter 112 is able to deliver energy to the capacitor C28 as well as the output of the main power converter 126. FIG. 16 illustrates in detail a schematic diagram of the hybrid dc/dc converter shown in FIG. 15 in accordance with an embodiment. As shown in FIG. 16, the low power converter employs a multiple output isolated dc/dc converter to maintain the voltage at the positive terminal of Cin. In addition, through the second transformer winding of the transformer $T_{x1}$, the lower power converter delivers energy to the output capacitor Co.

One advantageous feature of having the lower power converter coupled to the output capacitor directly is that the lower power converter can deliver energy to the load directly during some special operation conditions such as start-up, current limit and holdup time operations. It should be noted that the main power converter 0004 shown in FIG. 16 may operate in an unregulated mode. More particularly, the main power converter 0004 may operate in a 50% duty cycle. The output voltage of the hybrid dc/dc converter 1600 is regulated by controlling the voltage across the capacitor Cin. Alternatively, in order to adjust the electrical characteristics of the hybrid dc/dc converter 1600 during special operation conditions such as startup, current limit and holdup time operations, the main power converter 0004 may employ a regulated dc/dc converter such as a soft switching full bridge converter controlled by a PWM controller (not shown).

Figure 17:
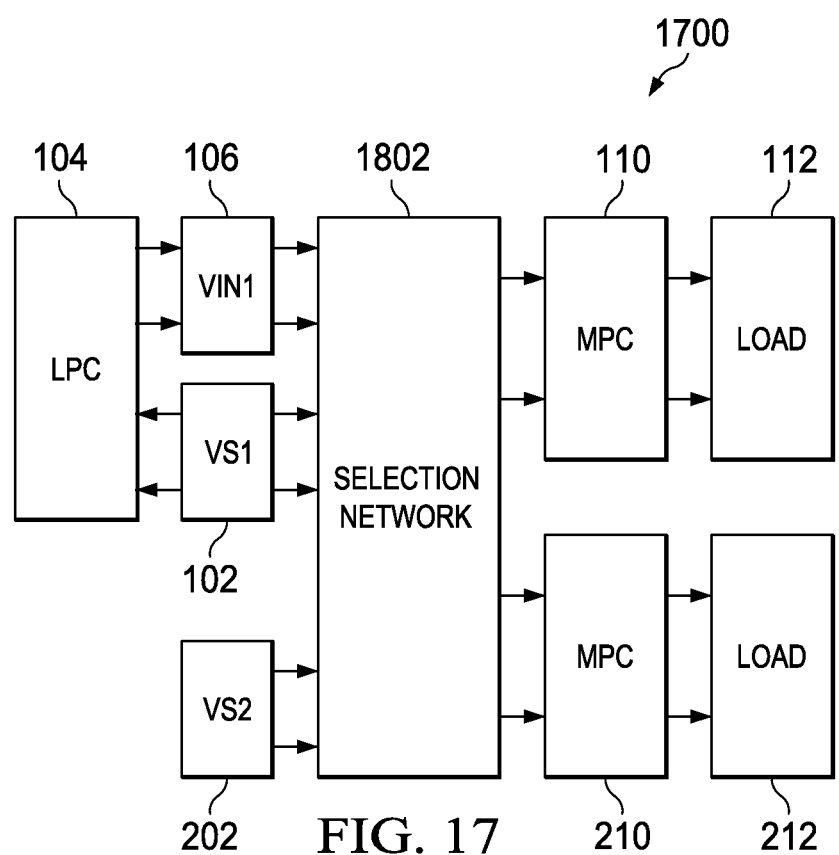
FIG. 17 illustrates a block diagram of a hybrid dc/dc converter in accordance with another embodiment.

FIG. 17 illustrates a block diagram of a hybrid dc/dc converter in accordance with another embodiment. The hybrid dc/dc converter 1700 shown in FIG. 17 is similar to the hybrid dc/dc converter 1000 shown in FIG. 10 except that main power converter in FIG. 17 includes two separate isolated power converters to form a multiple output power system. Alternatively, the isolated power converters shown in FIG. 17 may operate in an interleaving manner. As shown in FIG. 17, the first power converter 110 and the second power converter 210 may operate in a 50% duty cycle but having a phase shift between the leading edge of one PWM signal of the first power converter 110 and the leading edge of a corresponding PWM signal of the second power converter 210. The detailed operation of multi-phase power converters is well known in the art, and hence is not discussed herein.

Figure 18:
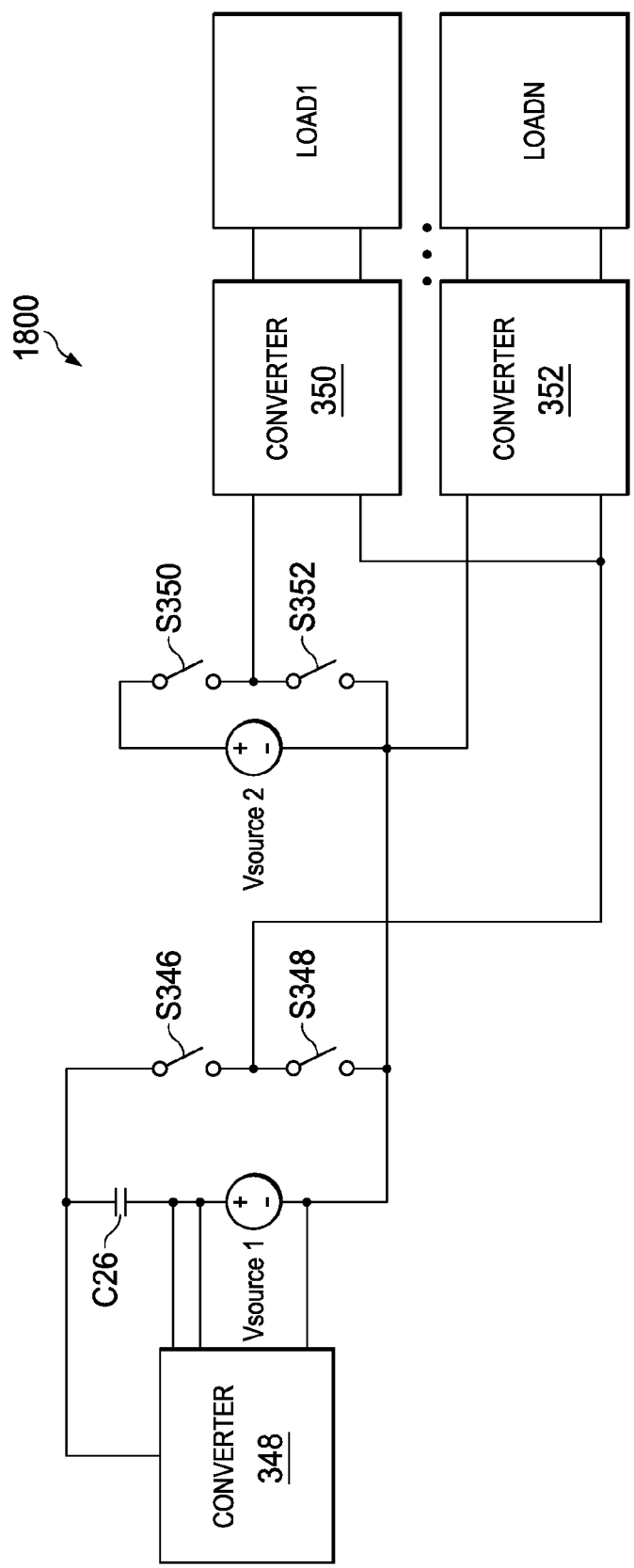
FIG. 18 illustrates a schematic diagram of the hybrid dc/dc converter shown in FIG. 17 in accordance with an embodiment.

FIG. 18 illustrates a schematic diagram of the hybrid dc/dc converter shown in FIG. 17 in accordance with an embodiment. The system configuration of FIG. 18 is similar to the system configuration shown in FIG. 12 except that the main power converter shown in FIG. 12 may be replaced by a plurality of power converters. The power converters (e.g., converter 350 and converter 352) may form a multiple output power system by connecting loads (e.g., Load 1 and Load N) to their corresponding power converters. Alternatively, there may be a plurality of multi-phase isolated converter operating in an interleaving manner. Such an interleaving manner helps to reduce ripple while improving transient response.

Figure 19A:
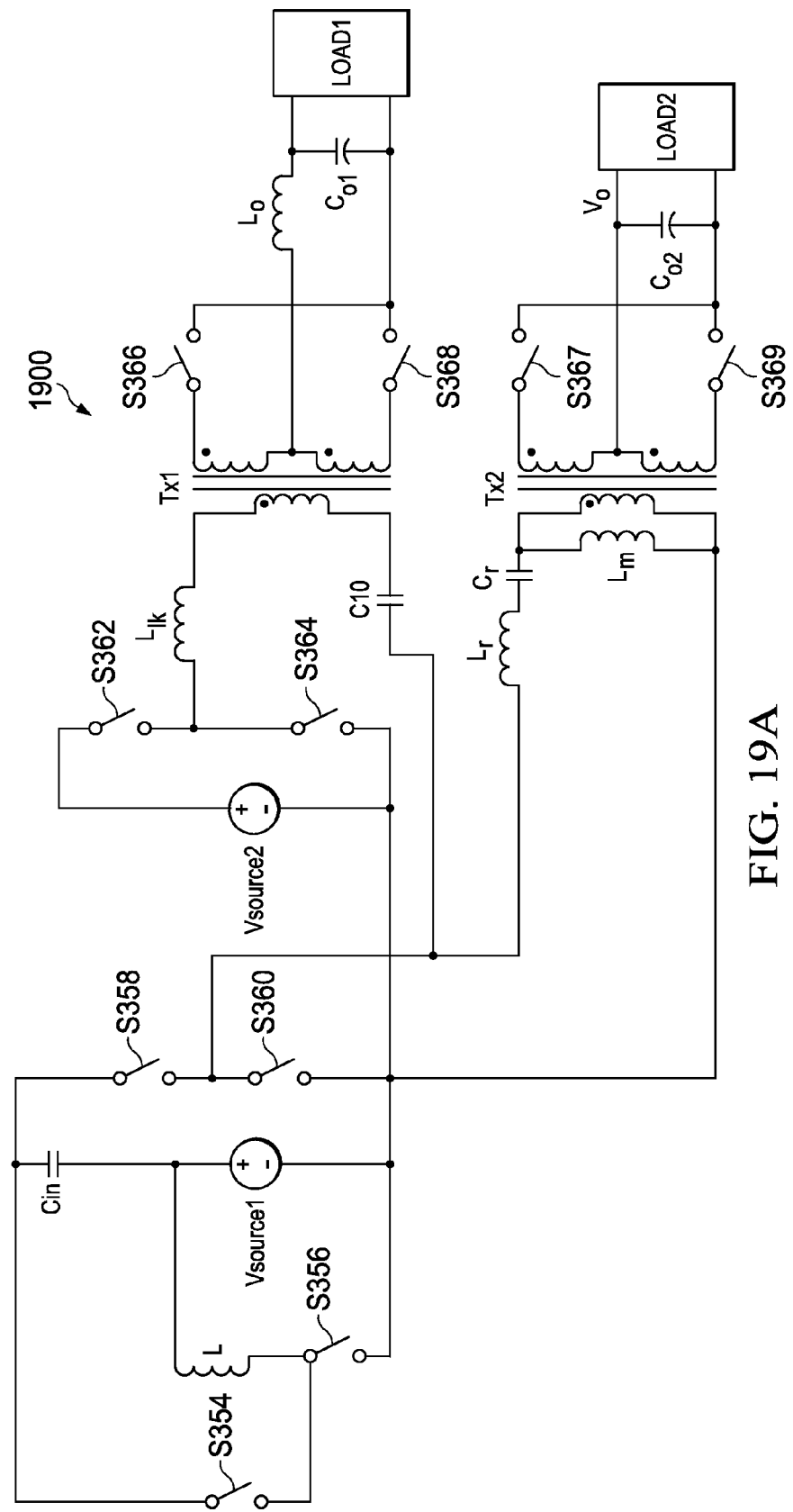
FIG. 19A illustrates in detail a schematic diagram of the hybrid dc/dc converter shown in FIG. 18 in accordance with an embodiment.

FIG. 19A illustrates in detail a schematic diagram of the hybrid dc/dc converter shown in FIG. 18 in accordance with an embodiment. As shown in FIG. 19A, the low power converter employs a boost dc/dc converter to maintain the voltage at the positive terminal of Cin. The first main power converter employs a PWM full bridge dc/dc converter. The output voltage of the first main power converter can be regulated by adjusting the output voltage of the low power converter. Alternatively, the output voltage of the first main power converter can be adjusted by adjusting the duty cycle of the PWM full bridge dc/dc converter.

Figure 19B:
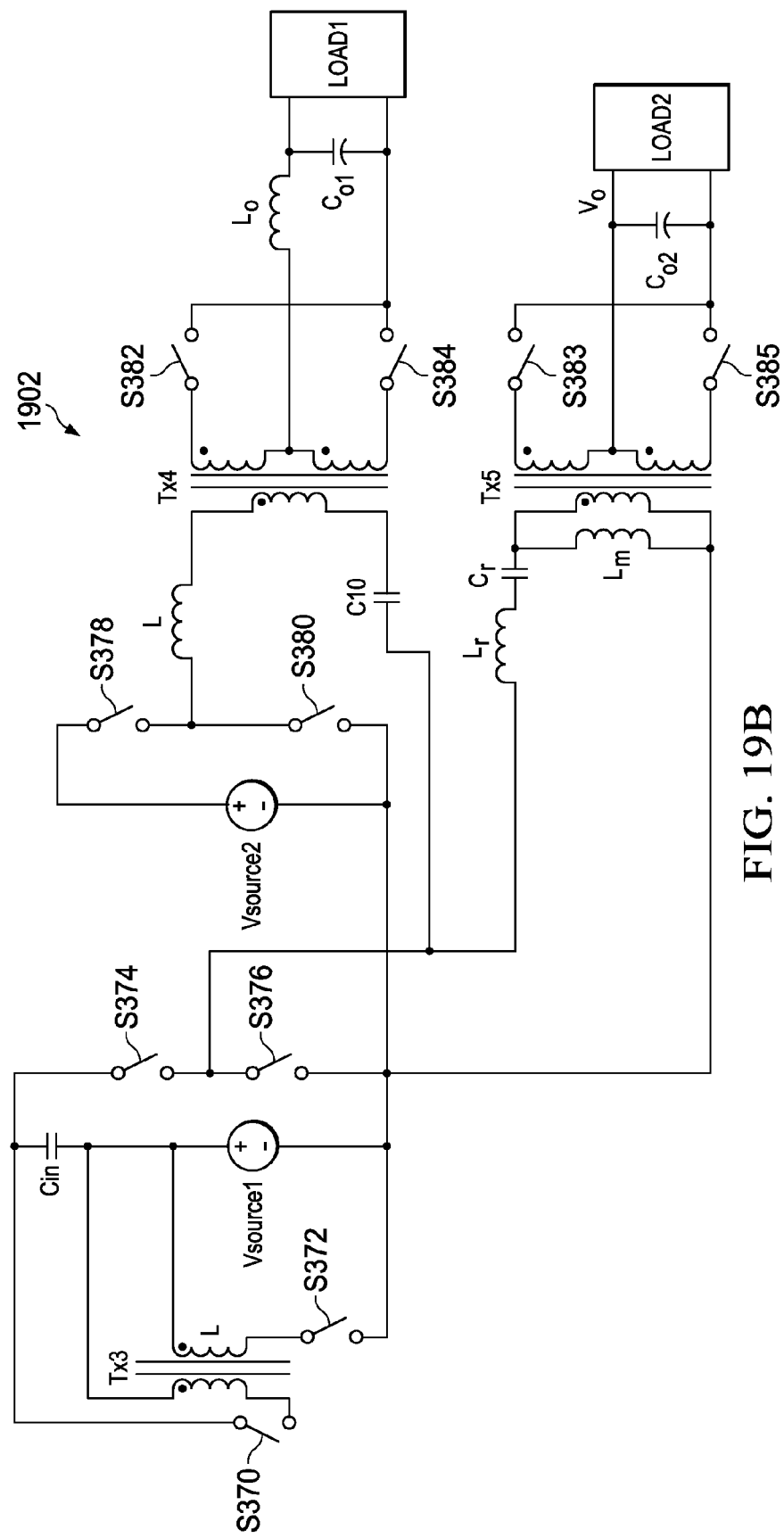
FIG. 19B illustrates in detail a schematic diagram of the hybrid dc/dc converter shown in FIG. 18 in accordance with another embodiment.

The second main power converter is implemented by a soft switching half bridge dc/dc converter. The output voltage of the second main power converter may be regulated by adjusting the switching frequency of the soft switching half bridge dc/dc converter. An embodiment timing diagram of the gate drive signals of FIG. 19A will be discussed below with respect to FIG. 20. FIG. 19B illustrates in detail a schematic diagram of the hybrid dc/dc converter shown in FIG. 18 in accordance with another embodiment. The system configuration in FIG. 19B is similar to that in FIG. 19A except that the low power converter employs an isolated dc/dc converter. As such, FIG. 19B is not discussed in detail herein.

Figure 20A:
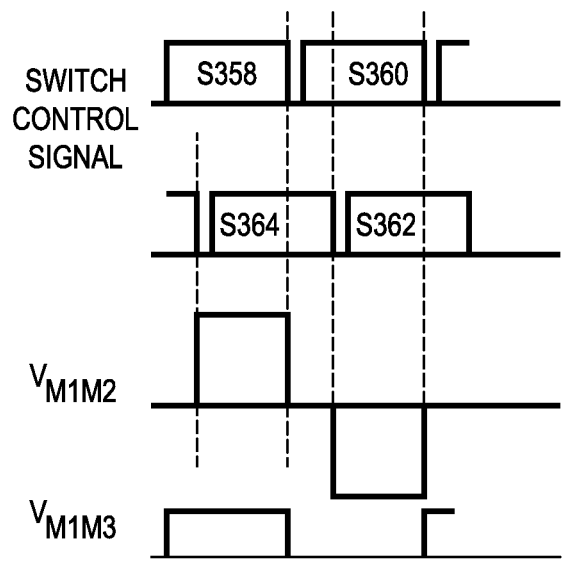
FIG. 20A illustrates a timing diagram of gate drive signals of FIG. 19A in accordance with an embodiment.
Figure 20B:
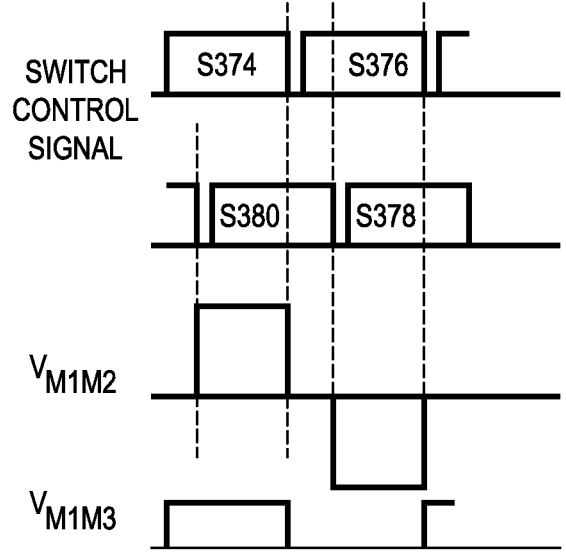
FIG. 20B illustrates a timing diagram of gate drive signals of FIG. 19B in accordance with an embodiment.

FIG. 20A illustrates a timing diagram of gate drive signals of FIG. 19A in accordance with an embodiment. As shown in FIG. 20A, instead of turning on two primary switches (e.g., S358 and S364) simultaneously, the turn-on time of these two switches are shifted by a period of time. More particularly, the gate drive waveform of S358 and the gate drive waveform 364 show S358 is on for a period of time before S364 is turned on. There is an overlap between S358's turn-on time and S364's turn-on time. After S358 is turned off, S364 stays on for a period of time. The phase shift full bridge can achieve a zero voltage switching by utilizing the L-C resonance between transformer leakage inductance and MOSFET (e.g., S358) output capacitance. FIG. 20B illustrates a timing diagram of gate drive signals of FIG. 19B in accordance with an embodiment. The phase shift mechanism of FIG. 20B is similar to that of FIG. 20A, and hence is not discussed in detail herein to avoid unnecessary repetition.

Figure 21:
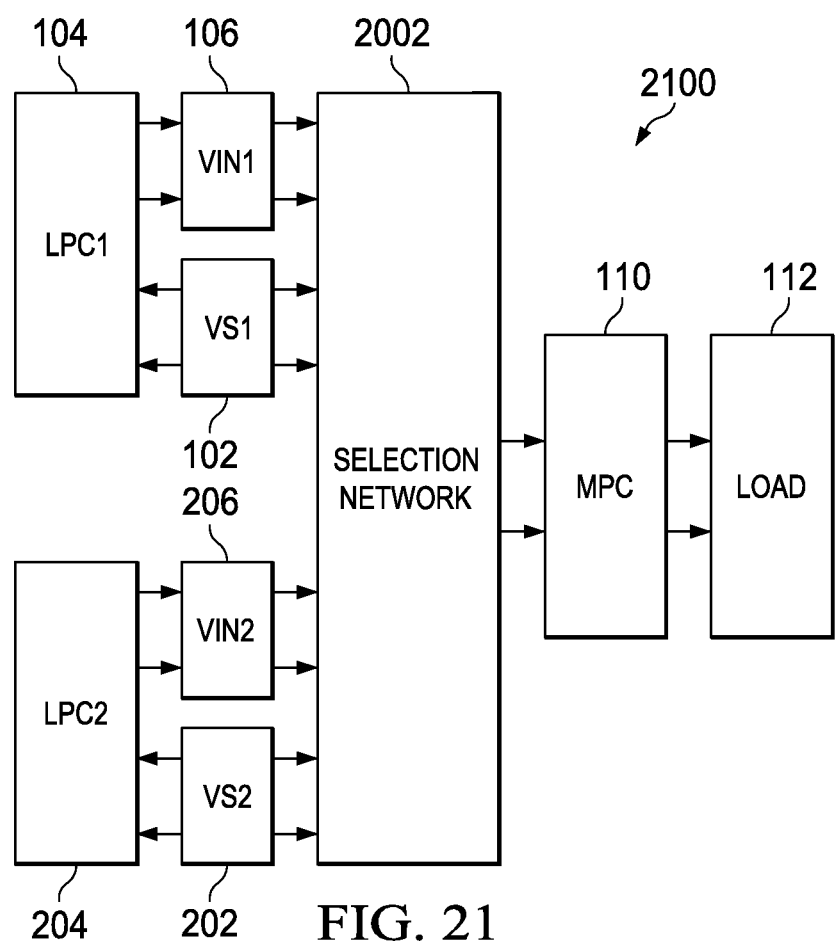
FIG. 21 illustrates a block diagram of a hybrid dc/dc converter in accordance with another embodiment.

FIG. 21 illustrates a block diagram of a hybrid dc/dc converter in accordance with another embodiment. The hybrid dc/dc converter 2100 shown in FIG. 21 is similar to the hybrid dc/dc converter 1000 shown in FIG. 10 except that one more low power converter is employed. As shown in FIG. 21, a second low power converter 204 is coupled between the third dc input voltage source 202 and a fourth dc voltage source 206. In accordance with an embodiment, the second low power converter 204 is similar to the first low power converter 104. In addition, the fourth dc voltage source 206 may employ a same power topology as the second dc voltage source 106. The detailed operation of the second low power converter will be described below with respect to FIG. 22A, FIG. 22B and FIG. 23.

Figure 22A:
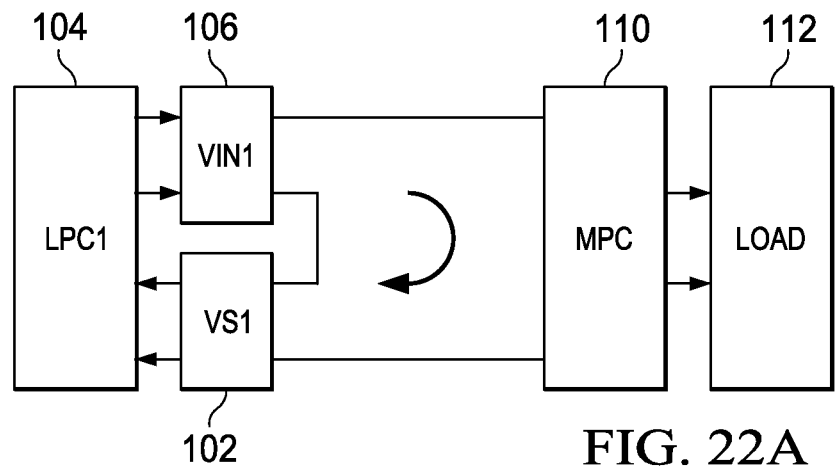
FIG. 22A illustrates a block diagram of a first half cycle system configuration of the hybrid dc/dc converter shown in FIG. 21 in accordance with an embodiment.
Figure 22B:
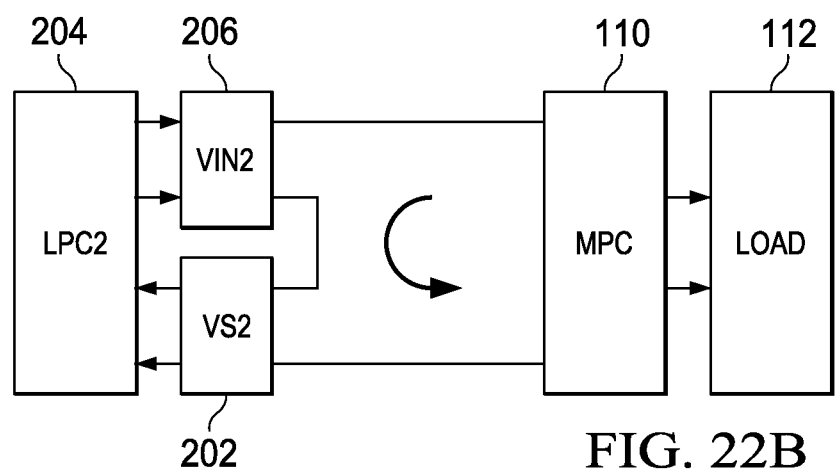
FIG. 22B illustrates a block diagram of a second half cycle system configuration of the hybrid dc/dc converter shown in FIG. 21 in accordance with an embodiment.

FIG. 22A illustrates a block diagram of a first half cycle system configuration of the hybrid dc/dc converter shown in FIG. 21 in accordance with an embodiment. During a first half cycle, the system configuration of the selection network is similar to that shown in FIG. 11A, and hence is not discussed in further detail to avoid unnecessary repetition. FIG. 22B illustrates a block diagram of a second half cycle system configuration of the hybrid dc/dc converter shown in FIG. 21 in accordance with an embodiment. The magnetic reset method shown in FIG. 22B is similar to that shown in FIG. 11B except that a combination of a third dc input voltage source 202 and the fourth dc input voltage source 206 is used to magnetically reset the transformer of the main power converter 110. It will be appreciated that using a same power source during the first half cycle and the second half cycle or using a different power source during two cycles is choice of design and depends on different needs of various applications.

Figure 23:
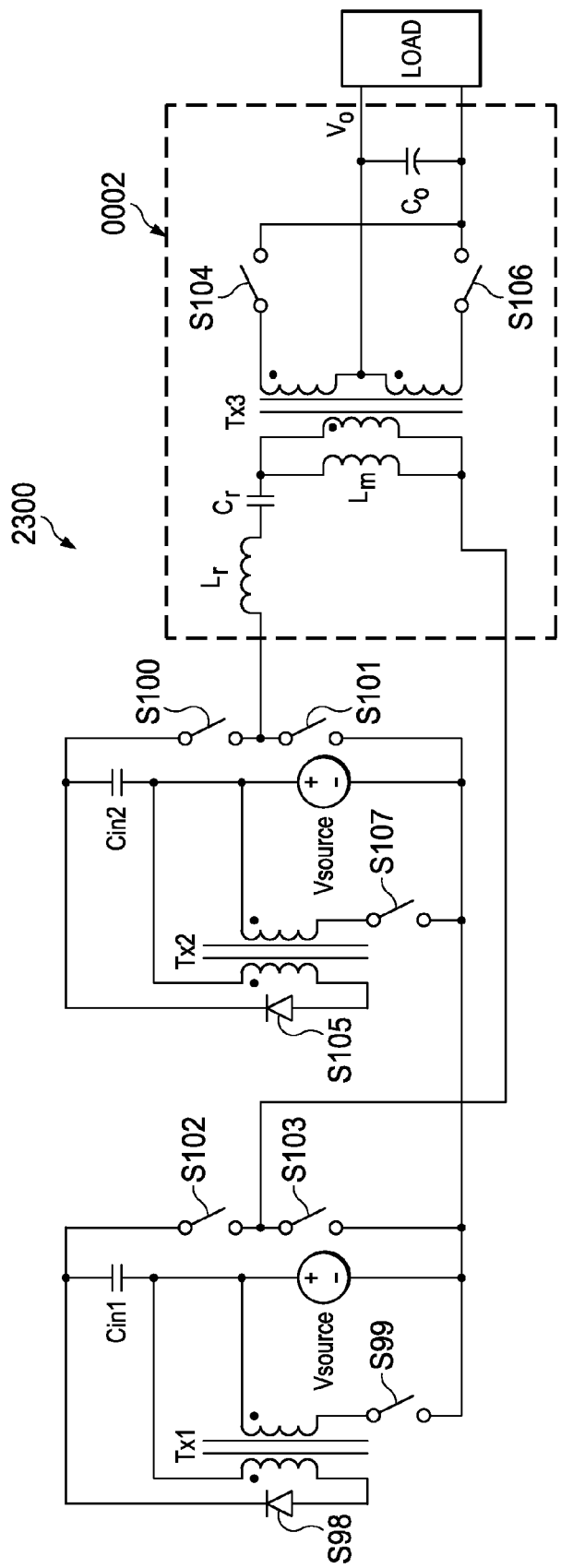
FIG. 23 illustrates a schematic diagram of the hybrid dc/dc converter shown in FIG. 21 in accordance with an embodiment.

FIG. 23 illustrates a schematic diagram of the hybrid dc/dc converter shown in FIG. 21 in accordance with an embodiment. The system configuration of FIG. 23 is similar to the system configuration shown in FIG. 13 except that a second low power converter is employed to provide further flexibility. As shown in FIG. 23, both the first low power converter and the second low power converter employ an isolated flyback converter to the voltages across Cin1 and Cin2 respectively. It will be appreciated that while FIG. 23 illustrates each low power converter employs a flyback converter, each low power converter may employ a same power conversion topology such as buck, boost, buck-boost, flyback, forward and the like. Alternatively, a person skilled in the art will recognize that it is within the scope of various embodiments that the first low power converter and the second low power converter may employ different power conversion topologies.

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus comprising:
   a first power source;
   a low power converter having an input coupled to the first power source and an output connected in series with the first power source;
   a selection network coupled to the first power source and the output of the low power converter; and
   a main isolated power converter coupled to the selection network.

2. The apparatus of claim 1, wherein the selection network is configured such that:
   during a first half cycle a combination of the output of the low power converter and the first power source is applied to the main isolated power converter; and
   during a second half cycle the first power source is applied to the main isolated power converter.

3. The apparatus of claim 1, wherein the selection network is configured such that:
   during a first half cycle a combination of the output of the low power converter and the first power source is applied to the main isolated power converter; and
   during a second half cycle the combination of the output of the low power converter and the first power source is applied to the main isolated power converter.

4. The apparatus of claim 1, further comprising:
   a second power source; and
   a second low power converter having an input coupled to the second power source and an output connected in series with the second power source.

5. The apparatus of claim 4, wherein the selection network is configured such that:
   during a first half cycle a combination of the output of the low power converter and the first power source is applied to the main isolated power converter; and
   during a second half cycle the combination of the output of the second low power converter and the second power source is applied to the main isolated power converter.

6. The apparatus of claim 1, wherein the main power converter is an unregulated full bridge converter.

7. The apparatus of claim 1, wherein the low power converter is a regulated dc/dc converter.

8. A system comprising:
a first power source;
a low power converter having an input coupled to the first power source and an output connected in series with the first power source;
a selection network coupled to the first power source and the output of the low power converter;
a first main isolated power converter coupled to the selection network; and
a second main isolated power converter coupled to the selection network.

9. The system of claim 8, wherein the first main isolated power converter comprises:
a first transformer;
a first rectifier coupled to the first transformer; and
a first output filter coupled to the first rectifier.

10. The system of claim 9, wherein the second main isolated power converter comprises:
a second transformer;
a second rectifier coupled to the second transformer; and
a second output filter coupled to the second rectifier.

11. The system of claim 10, wherein the selection network is configured such that the first main isolated power converter and the second main isolated power converter form a multiple output power converter.

12. The system of claim 11, wherein the selection network is configured such that the first main isolated power converter and the second main isolated power converter operate in an interleaving manner to form a multi-phase power converter.

13. The system of claim 8, wherein:
the first main isolated power converter and the second main isolated power converter employ a full bridge power conversion topology.

14. The system of claim 13, wherein:
the first main isolated power converter is unregulated and operates in a 50% duty cycle; and
the second main isolated power converter is unregulated and operates in a 50% duty cycle.

15. A method comprising:
providing power from a first power source coupled to a low power converter;
converting an output of the first power source to a first auxiliary voltage source connected in series with the first power source;
applying a first combination of the first power source and the first auxiliary voltage source to an unregulated power converter during a first half cycle; and
applying a second combination of the first power source and the first auxiliary voltage source to the unregulated power converter during a second half cycle.

16. The method of claim 15, further comprising operating a selection network to be coupled between the unregulated power converter and first power source and the first auxiliary voltage source.

17. The method of claim 16, further comprising operating the selection network to:
provide a power current from a first direction of the unregulated power converter during a first half cycle; and
provide a power current from a second direction of the unregulated power converter during a second half cycle.

18. The method of claim 17, wherein the first direction is opposite to the second direction so that a transformer of the unregulated power converter is reset during the second half cycle.

19. The method of claim 18, further comprising:
blocking a dc current using a capacitor connected in series with the transformer of the unregulated power converter.

20. The method of claim 15, further comprising:
operating a second power source to be coupled to a second low power converter; and
converting an output of the second power source to a second auxiliary voltage source connected in series with the second power source.

* * * * *